(12) United States Patent
Jin et al.

(10) Patent No.: US 12,361,939 B2
(45) Date of Patent: Jul. 15, 2025

(54) ELECTRONIC DEVICE FOR PROVIDING UPDATE INFORMATION THROUGH AN ARTIFICIAL INTELLIGENCE AGENT SERVICE

(71) Applicant: Samsung Electronics Co., Ltd., Gyeonggi-do (KR)

(72) Inventors: Sungbin Jin, Gyeonggi-do (KR); Jooyong Byeon, Gyeonggi-do (KR); Kichul Kim, Gyeonggi-do (KR); Youngkyu Kim, Gyeonggi-do (KR); Yeseul Lee, Gyeonggi-do (KR); Jisun Choi, Gyeonggi-do (KR); Jeehun Ha, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 192 days.

(21) Appl. No.: 17/686,908

(22) Filed: Mar. 4, 2022

(65) Prior Publication Data
US 2022/0375467 A1 Nov. 24, 2022

Related U.S. Application Data

(63) Continuation of application No. PCT/KR2022/001960, filed on Feb. 9, 2022.

(30) Foreign Application Priority Data

May 6, 2021 (KR) .......................... 10-2021-0058763

(51) Int. Cl.
*G10L 15/22* (2006.01)
*G10L 15/16* (2006.01)

(52) U.S. Cl.
CPC .............. *G10L 15/22* (2013.01); *G10L 15/16* (2013.01); *G10L 2015/223* (2013.01); *G10L 2015/228* (2013.01)

(58) Field of Classification Search
None
See application file for complete search history.

(56) References Cited

U.S. PATENT DOCUMENTS 8,131,267 B2   3/2012   Lichorowic et al.
8,422,642 B2   4/2013   Suito
(Continued)

FOREIGN PATENT DOCUMENTS

CN   107146612   9/2017
JP   2009-093539   4/2009
(Continued)

OTHER PUBLICATIONS

International Search Report dated May 17, 2022 issued in counterpart application No. PCT/KR2022/001960, 9 pages.
(Continued)

*Primary Examiner* — Jonathan C Kim
(74) *Attorney, Agent, or Firm* — The Farrell Law Firm, P.C.

(57) ABSTRACT

An electronic device is provided and includes a processor and a memory operatively connected to the processor. The memory stores instructions that cause, when executed, the processor to acquire a first assistant result including data indicative of a first intent understood from an utterance of a first user, data indicative of an attribute of the utterance, first information provided to a terminal of the first user as a response of an artificial intelligence (AI) agent to the utterance, and a first parameter indicative of an attribute of the first information, to recognize the utterance as an information request utterance, based on the first intent and the attribute, and to track second information to be provided to the first user terminal as update information for the first
(Continued)

information, based on the utterance being recognized as the information request utterance and the first parameter being identified as a specified type.

12 Claims, 17 Drawing Sheets

(56) References Cited

U.S. PATENT DOCUMENTS

| | | | | |
|---|---|---|---|---|
| 9,747,896 | B2* | 8/2017 | Kennewick, Jr. | G06F 40/40 |
| 10,169,327 | B2* | 1/2019 | Allen | G06Q 10/109 |
| 2004/0181604 | A1* | 9/2004 | Immonen | G06F 16/9535 |
| | | | | 707/E17.109 |
| 2005/0086270 | A1* | 4/2005 | Shimizu | G06F 16/2358 |
| 2011/0125540 | A1 | 5/2011 | Jang et al. | |
| 2013/0111003 | A1* | 5/2013 | Burckart | G06F 16/957 |
| | | | | 709/223 |
| 2014/0282003 | A1* | 9/2014 | Gruber | G06F 3/167 |
| | | | | 715/727 |
| 2015/0178393 | A1* | 6/2015 | Perrin | G06Q 10/10 |
| | | | | 707/722 |
| 2016/0034457 | A1* | 2/2016 | Bradley | G06F 16/24578 |
| | | | | 707/749 |
| 2016/0092581 | A1* | 3/2016 | Joshi | G06F 16/9535 |
| | | | | 707/732 |
| 2016/0110347 | A1* | 4/2016 | Kennewick, Jr. | G10L 15/18 |
| | | | | 704/9 |
| 2016/0165038 | A1 | 6/2016 | Lim et al. | |
| 2016/0342694 | A1 | 11/2016 | Allen et al. | |
| 2016/0342886 | A1 | 11/2016 | Allen et al. | |
| 2016/0342900 | A1* | 11/2016 | Allen | G06Q 10/109 |
| 2017/0061005 | A1* | 3/2017 | Purcell | H04L 67/306 |
| 2017/0109390 | A1* | 4/2017 | Bradley | G06F 16/335 |
| 2017/0142044 | A1* | 5/2017 | Ball | G06Q 30/02 |
| 2017/0358303 | A1 | 12/2017 | Walker, II et al. | |
| 2018/0165580 | A1* | 6/2018 | Boyer | G06F 16/00 |
| 2018/0366116 | A1* | 12/2018 | Nicholson | G10L 15/22 |
| 2019/0205474 | A1* | 7/2019 | Pawar | G06F 40/205 |
| 2019/0235936 | A1* | 8/2019 | Murdock | H04W 68/02 |
| 2020/0058299 | A1 | 2/2020 | Lee et al. | |
| 2020/0082820 | A1 | 3/2020 | Koga | |
| 2020/0103963 | A1 | 4/2020 | Kelly et al. | |
| 2020/0233539 | A1* | 7/2020 | Liu | G06N 5/048 |
| 2022/0375467 | A1* | 11/2022 | Jin | G10L 15/22 |

FOREIGN PATENT DOCUMENTS

| | | | | |
|---|---|---|---|---|
| JP | 2020-042074 | | 3/2020 | |
| JP | 2020-101778 | | 7/2020 | |
| KR | 1020050038871 | | 4/2005 | |
| KR | 10-0526778 | | 10/2005 | |
| KR | 20070061188 A | * | 6/2007 | G06F 17/40 |
| KR | 1020130012240 | | 2/2013 | |
| KR | 10-1452415 | | 10/2014 | |
| KR | 10-1484702 | | 1/2015 | |
| KR | 1020180055705 | | 5/2018 | |
| KR | 10-1960835 | | 3/2019 | |
| KR | 1020200142124 | | 12/2020 | |

OTHER PUBLICATIONS

European Search Report dated May 24, 2024 issued in counterpart application No. 22798977.9-1203, 7 pages.
European Search Report dated May 15, 2025 issued in counterpart application No. 22798977.9-1207, 6 pages.

* cited by examiner

ELECTRONIC DEVICE FOR PROVIDING UPDATE INFORMATION THROUGH AN ARTIFICIAL INTELLIGENCE AGENT SERVICE

CROSS-REFERENCE TO RELATED APPLICATION(S)

This application is a bypass continuation application of International Application No. PCT/KR2022/001960, which was filed on Feb. 9, 2022, and is based on and claims priority under 35 U.S.C. § 119 to Korean Patent Application No. 10-2021-0058763, which was filed in the Korean Intellectual Property Office on May 6, 2021, the entire disclosure of each of which is incorporated herein by reference.

BACKGROUND

1. Field

The disclosure relates generally to an electronic device for providing update information to a user through an artificial intelligence (AI) agent service.

2. Description of Related Art

An electronic device is capable of providing a user with an AI agent service that recognizes a user voice (utterance) section in an audio signal, understands a user's intent from a user's utterance within the recognized section, and outputs a response corresponding to the user's intent to the user with a voice. The user's utterance may include an utterance requesting information or a function execution and an utterance (e.g., chitchat) irrelevant to an information request. When a request utterance is received, a system for providing the AI agent service may acquire requested information, generate an agent's answer using the acquired information, and provide the generated answer to the user with a voice.

Information provided to a user in response to a request utterance may be updated. For example, a weather forecast may be changed.

Thus, a need exists for an electronic device that can be configured to provide valid update information to a user.

SUMMARY

The disclosure addresses at least the problems and/or disadvantages described above and provides at least the advantages described below.

According to an aspect of the disclosure, an electronic device includes a processor and a memory operatively connected to the processor. The memory stores instructions that, when executed, cause the processor to acquire a first assistant result including data indicative of a first intent understood from an utterance of a first user, data indicative of an attribute of the utterance, first information provided to a terminal of the first user as a response of an AI agent to the utterance, and a first parameter indicative of an attribute of the first information, to recognize the utterance as an information request utterance, based on the first intent and the attribute, and to track second information to be provided to the first user terminal as update information for the first information, based on the utterance being recognized as the information request utterance and the first parameter being identified as a specified type.

According to another aspect of the disclosure, a method for operating an electronic device includes acquiring a first assistant result including data indicative of a first intent understood from an utterance of a first user, data indicative of an attribute of the utterance, first information provided to a terminal of the first user as a response of an AI agent to the utterance, and a first parameter indicative of an attribute of the first information; recognizing the utterance as an information request utterance, based on the first intent and the attribute; and tracking second information to be provided to the first user terminal as update information for the first information, based on the utterance being recognized as the information request utterance and the first parameter being identified as a specified type.

BRIEF DESCRIPTION OF DRAWINGS

The above and other aspects, features, and advantages of certain embodiments of the disclosure will be more apparent from the following description taken in conjunction with the accompanying drawings, in which.

DETAILED DESCRIPTION

Figure 1:
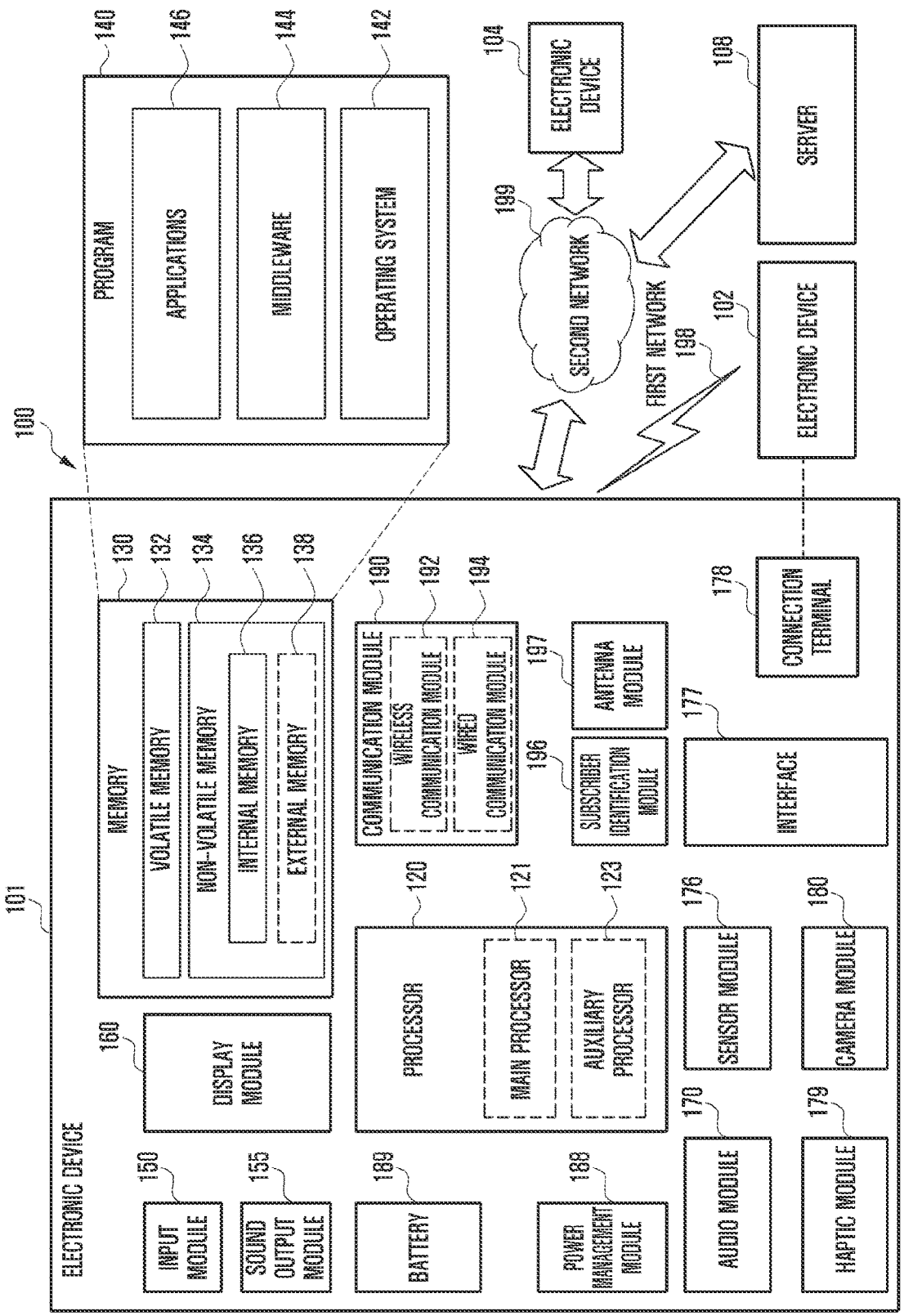
FIG. 1 is a block diagram of an electronic device in a network environment, according to an embodiment.

Various embodiments of the present disclosure are described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

According to various embodiments of the disclosure, an electronic device can provide a user with valid update information that the user is not aware of. In addition, various effects explicitly or implicitly appreciated through the disclosure may be provided.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123. According to an embodiment, the auxiliary processor 123 (e.g., the NPU) may include a hardware structure specified for AI model processing. An AI model may be generated by machine learning. Such learning may be performed, e.g., by the electronic device 101 where the AI is performed or via a separate server (e.g., the server 108). Learning algorithms may include, but are not limited to, e.g., supervised learning, unsupervised learning, semi-supervised learning, or reinforcement learning. The AI model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The AI model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
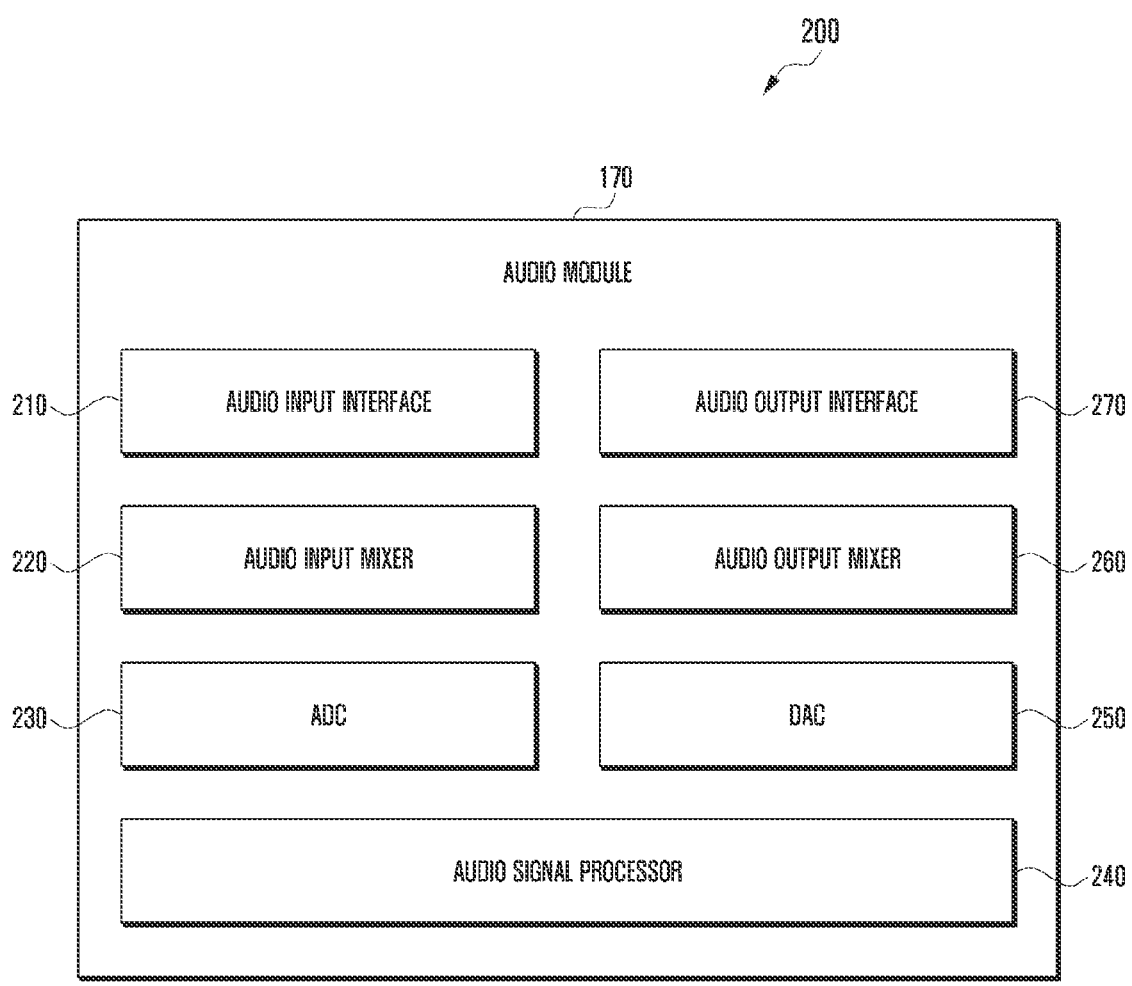
FIG. 2 is a block diagram illustrating an audio module, according to an embodiment.

FIG. 2 is a block diagram 200 illustrating the audio module 170 according to various embodiments. Referring to FIG. 2, the audio module 170 may include, for example, an audio input interface 210, an audio input mixer 220, an analog-to-digital converter (ADC) 230, an audio signal processor 240, a digital-to-analog converter (DAC) 250, an audio output mixer 260, or an audio output interface 270.

The audio input interface 210 may receive an audio signal corresponding to a sound obtained from the outside of the electronic device 101 via a microphone (e.g., a dynamic microphone, a condenser microphone, or a piezo microphone) that is configured as part of the input module 150 or separately from the electronic device 101. For example, if an audio signal is obtained from the external electronic device 102 (e.g., a headset or a microphone), the audio input interface 210 may be connected with the external electronic device 102 directly via the connecting terminal 178, or wirelessly (e.g., Bluetooth™ communication) via the wireless communication module 192 to receive the audio signal. According to an embodiment, the audio input interface 210 may receive a control signal (e.g., a volume adjustment signal received via an input button) related to the audio signal obtained from the external electronic device 102. The audio input interface 210 may include a plurality of audio input channels and may receive a different audio signal via a corresponding one of the plurality of audio input channels, respectively. According to an embodiment, additionally or alternatively, the audio input interface 210 may receive an audio signal from another component (e.g., the processor 120 or the memory 130) of the electronic device 101.

The audio input mixer 220 may synthesize a plurality of inputted audio signals into at least one audio signal. For example, according to an embodiment, the audio input mixer 220 may synthesize a plurality of analog audio signals inputted via the audio input interface 210 into at least one analog audio signal.

The ADC 230 may convert an analog audio signal into a digital audio signal. For example, according to an embodiment, the ADC 230 may convert an analog audio signal received via the audio input interface 210 or, additionally or alternatively, an analog audio signal synthesized via the audio input mixer 220 into a digital audio signal.

The audio signal processor 240 may perform various processing on a digital audio signal received via the ADC 230 or a digital audio signal received from another component of the electronic device 101. For example, according to an embodiment, the audio signal processor 240 may perform changing a sampling rate, applying one or more filters, interpolation processing, amplifying or attenuating a whole or partial frequency bandwidth, noise processing (e.g., attenuating noise or echoes), changing channels (e.g., switching between mono and stereo), mixing, or extracting a specified signal for one or more digital audio signals. According to an embodiment, one or more functions of the audio signal processor 240 may be implemented in the form of an equalizer.

The DAC 250 may convert a digital audio signal into an analog audio signal. For example, according to an embodiment, the DAC 250 may convert a digital audio signal processed by the audio signal processor 240 or a digital audio signal obtained from another component (e.g., the processor (120) or the memory (130)) of the electronic device 101 into an analog audio signal.

The audio output mixer 260 may synthesize a plurality of audio signals, which are to be outputted, into at least one audio signal. For example, according to an embodiment, the audio output mixer 260 may synthesize an analog audio signal converted by the DAC 250 and another analog audio signal (e.g., an analog audio signal received via the audio input interface 210) into at least one analog audio signal.

The audio output interface 270 may output an analog audio signal converted by the DAC 250 or, additionally or alternatively, an analog audio signal synthesized by the audio output mixer 260 to the outside of the electronic device 101 via the sound output module 155. The sound output module 155 may include, for example, a speaker, such as a dynamic driver or a balanced armature driver, or a receiver. According to an embodiment, the sound output module 155 may include a plurality of speakers. In such a case, the audio output interface 270 may output audio signals having a plurality of different channels (e.g., stereo channels or 5.1 channels) via at least some of the plurality of speakers. According to an embodiment, the audio output interface 270 may be connected with the external electronic device 102 (e.g., an external speaker or a headset) directly via the connecting terminal 178 or wirelessly via the wireless communication module 192 to output an audio signal.

According to an embodiment, the audio module 170 may generate, without separately including the audio input mixer 220 or the audio output mixer 260, at least one digital audio signal by synthesizing a plurality of digital audio signals using at least one function of the audio signal processor 240.

According to an embodiment, the audio module 170 may include an audio amplifier (not shown) (e.g., a speaker amplifying circuit) that is capable of amplifying an analog audio signal inputted via the audio input interface 210 or an audio signal that is to be outputted via the audio output interface 270. According to an embodiment, the audio amplifier may be configured as a module separate from the audio module 170.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
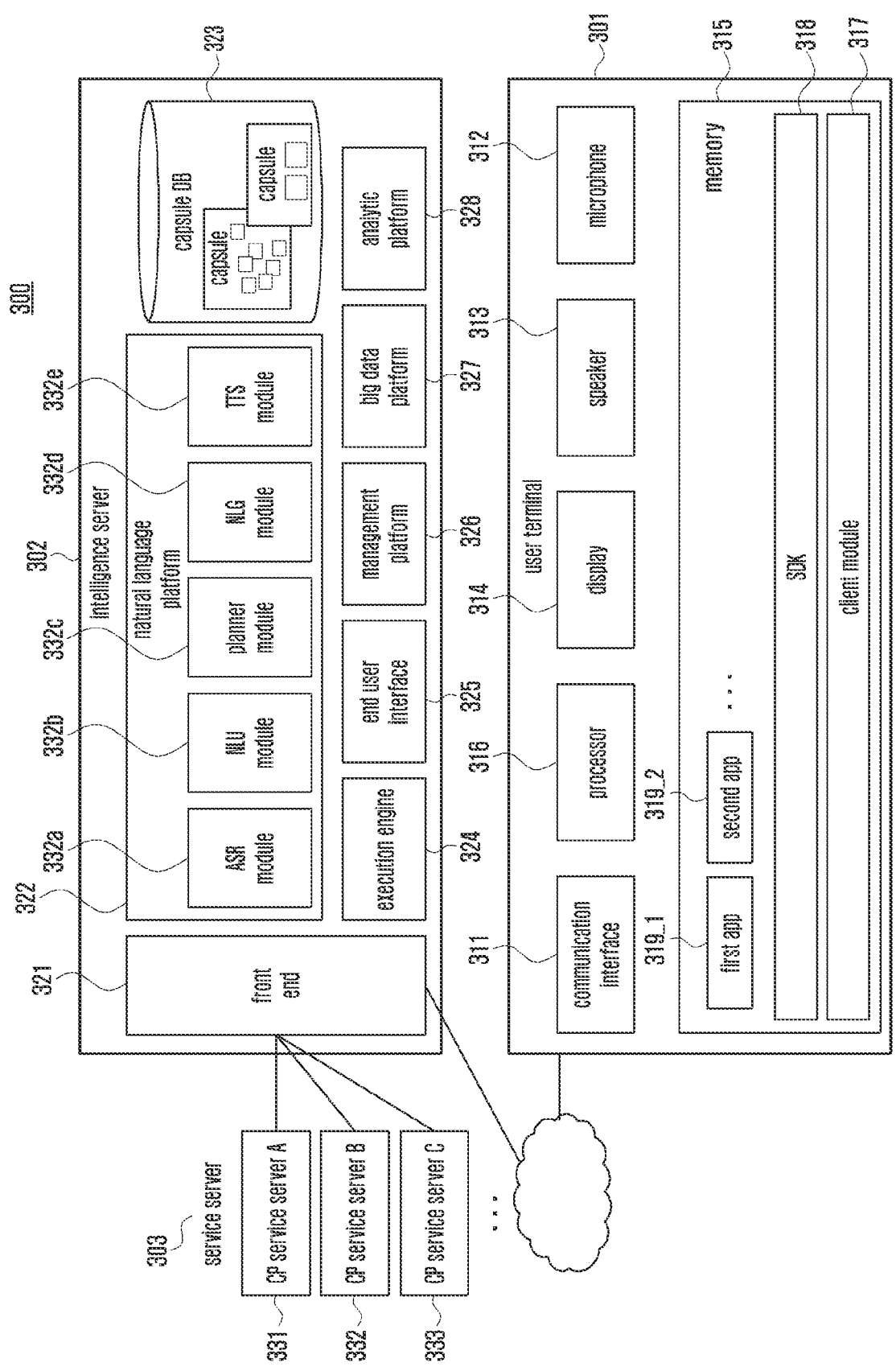
FIG. 3 is a block diagram illustrating an integrated intelligence system, according to an embodiment.

FIG. 3 is a block diagram illustrating an integrated intelligence system according to an embodiment.

Referring to FIG. 3, the integrated intelligence system 300 according to an embodiment may include a user terminal 301, an intelligent server 302, and a service server 303.

According to an embodiment, the user terminal 301 may be a terminal device (or electronic device) that can be connected to the Internet, for example, a mobile phone, a smartphone, a personal digital assistant (PDA), a notebook computer, a TV, a domestic appliance, a wearable device, an HMD, or a smart speaker.

According to an embodiment, the user terminal 301 (e.g., the electronic device 101 of FIG. 1) may include a communication interface 311, a microphone 312, a speaker 313, a display 314, a memory 315, and a processor 316. The listed components may be operatively or electrically connected to each other.

According to an embodiment, the communication interface 311 may be configured to be connected to an external device to transmit and receive data. According to an embodiment, the microphone 312 may receive a sound (e.g., a user's utterance) and may convert the sound into an electrical signal. According to an embodiment, the speaker 313 may output an electrical signal as a sound (e.g., a voice). According to an embodiment, the display 314 may be configured to display an image or a video. According to an embodiment, the display 314 may display a graphic user interface (GUI) of an executed application (or application program).

According to an embodiment, the memory 315 may store a client module 317, a software development kit (SDK) 318, and a plurality of applications 319_1 and 319_2. The client module 317 and the SDK 318 may form a framework (or a solution program) for performing a general-purpose function. In addition, the client module 317 or the SDK 318 may form a framework for processing a voice input.

According to an embodiment, the plurality of applications 319_1 and 319_2 in the memory 315 may be programs for performing a designated function. According to an embodiment, the plurality of applications 319_1 and 319_2 may include a first application 319_1 and a second application 319_2. According to an embodiment, each of the plurality of applications 319_1 and 319_2 may include a plurality of operations for performing a designated function. For example, the plurality of applications 319_1 and 319_2 may include at least one of an alarm application, a message application, and a schedule application. According to an embodiment, the plurality of applications 319_1 and 319_2 may be executed by the processor 316 to sequentially execute at least some of the plurality of operations.

According to an embodiment, the processor 316 may control the overall operation of the user terminal 301. For example, the processor 316 may be electrically connected to the communication interface 311, the microphone 312, the speaker 313, the display 314, and the memory 315 to perform a designated operation.

According to an embodiment, the processor 316 may also execute a program stored in the memory 315 to perform a designated function. For example, the processor 316 may execute at least one of the client module 317 or the SDK 318 to perform the following operation for processing a voice input. The processor 316 may control the operation of the plurality of applications 319_1 and 319_2, for example, through the SDK 318. An operation to be described below as the operation of the client module 317 or the SDK 318 may be an operation by execution by the processor 316.

According to an embodiment, the client module 317 may receive a voice input. For example, the client module 317 may generate a voice signal corresponding to a user's utterance detected through the microphone 312. The client module 317 may transmit the received voice input to the intelligent server 302. According to an embodiment, the client module 317 may transmit state information about the user terminal 301, together with the received voice input, to the intelligent server 302. The state information may be, for example, execution state information about an application.

According to an embodiment, the client module 317 may receive a result corresponding to the received voice input. For example, the client module 317 may receive the result corresponding to the received voice input from the intelligent server 302. The client module 317 may display the received result on the display 314.

According to an embodiment, the client module 317 may receive a plan corresponding to the received voice input. The client module 317 may display a result of executing a plurality of operations of an application according to the plan on the display 314. For example, the client module 317 may sequentially display results of executing the plurality of operations on the display. In another example, the user terminal 301 may display only some (e.g., a result of executing the last operation) of the results of executing the plurality of operations on the display.

According to an embodiment, the client module 317 may receive a request for obtaining information required to produce the result corresponding to the voice input from the intelligent server 302. The information required to produce the result may be, for example, state information about an electronic device 300. According to an embodiment, the client module 317 may transmit the required information to the intelligent server 302 in response to the request.

According to an embodiment, the client module 317 may transmit information about the result of executing the plurality of operations according to the plan to the intelligent server 302. The intelligent server 302 may identify that the received voice input has been properly processed using the information about the result.

According to an embodiment, the client module 317 may include a voice recognition module. According to an embodiment, the client module 317 may recognize a voice input for performing a limited function through the voice recognition module. For example, the client module 317 may perform an intelligent application for processing a voice input for performing an organic operation through a designated input (e.g., Wake up!). The client module 317 may recognize a call utterance (e.g., Hi Bixby) in an audio signal received from the microphone 312 and may start an AI agent service in response to the call utterance.

According to an embodiment, the intelligent server 302 (e.g., the server 108 of FIG. 1) may receive information relating to a user voice input from the user terminal 301 through a communication network. According to an embodiment, the intelligent server 302 may change data relating to the received voice input into text data. According to an embodiment, the intelligent server 302 may generate, based on the text data, a plan for performing a task corresponding to the user voice input.

According to an embodiment, the plan may be generated by an AI system. The AI system may be a rule-based system or a neural network-based system (e.g., a feedforward neural network (FNN)), or a recurrent neural network (RNN). Alternatively, the AI system may be a combination of the above systems or a different AI system. According to an embodiment, the plan may be selected from a set of predefined plans, or may be generated in real time in response to a user request. For example, the AI system may select at least one plan from among a plurality of predefined plans.

According to an embodiment, the intelligent server 302 may transmit a result obtained according to the generated plan to the user terminal 301 or may transmit the generated plan to the user terminal 301. According to an embodiment, the user terminal 301 may display the result obtained according to the plan on the display 314. According to an embodiment, the user terminal 301 may display a result of executing an operation according to the plan on the display.

According to an embodiment, the intelligent server 302 may include a front end 321, a natural language platform 322, a capsule DB 323, an execution engine 324, an end user interface 325, a management platform 326, a big data platform 327, and an analytic platform 328.

According to an embodiment, the front end 321 may receive a voice input received from the user terminal 301. The front end 321 may transmit a response corresponding to the voice input.

According to an embodiment, the natural language platform 322 may include an automatic speech recognition module (ASR module) 322a, a natural language understanding module (NLU module) 322b, a planner module 322c, a natural language generator module (NLG module) 322d, and a text-to-speech module (TTS module) 322e.

According to an embodiment, the ASR module 322a may convert a voice input received from the user terminal 301 into text data.

According to an embodiment, the NLU module 322b may understand a user's intent using the text data of the voice input. For example, the NLU module 322b may understand the user's intent by performing a syntactic analysis or a semantic analysis. According to an embodiment, the NLU module 322b may understand the meaning of a word extracted from the voice input using a linguistic feature (e.g., a syntactic element) of a morpheme or phrase and may determine the user's intent by matching the understood meaning of the word to intent.

According to an embodiment, the planner module 322c may generate a plan using the intent determined by the NLU module 322b and a parameter. According to an embodiment, the planner module 322c may determine a plurality of domains necessary to perform a task based on the determined intent. The planner module 322c may determine a plurality of operations respectively included in the plurality of domains determined based on the intent. According to an embodiment, the planner module 322c may determine a parameter required to execute the plurality of determined operations or a result value output by executing the plurality of operations. The parameter and the result value may be defined as a concept related to a designated format (or class). Accordingly, the plan may include the plurality of operations determined by the intent of the user and a plurality of concepts. The planner module 322c may determine a relationship between the plurality of operations and the plurality of concepts by stages (or hierarchically). For example, the planner module 322c may determine the execution order of the plurality of operations, determined based on the user's intent, based on the plurality of concepts. That is, the planner module 322c may determine the execution order of the plurality of operations, based on the parameter required to execute the plurality of operations and the result output by executing the plurality of operations. Accordingly, the planner module 322c may generate a plan including association information (e.g., ontology) between the plurality of operations and the plurality of concepts. The planner module 322c may generate a plan using information stored in a capsule DB 323 in which a set of relationships between concepts and operations is stored.

According to an embodiment, the NLG module 322d may change designated information into a text form. The information changed into the text form may be in the form of a natural language utterance.

According to an embodiment, the TTS module 322e may change information in the text form into information in a voice form.

According to an embodiment, the capsule DB 323 may store information about a relationship between a plurality of concepts and a plurality of operations corresponding to a plurality of domains. For example, the capsule DB 323 may store a plurality of capsules including a plurality of action objects (or pieces of action information) and a plurality of concept objects (or pieces of concept information) of a plan. According to an embodiment, the capsule DB 323 may store the plurality of capsules in the form of a concept action network (CAN). According to an embodiment, the plurality of capsules may be stored in a function registry included in the capsule DB 323.

According to an embodiment, the capsule DB 323 may include a strategy registry that stores strategy information required to determine a plan corresponding to a voice input. The strategy information may include reference information for determining one plan when there is a plurality of plans corresponding to the voice input. According to an embodiment, the capsule DB 323 may include a follow-up registry that stores information about a follow-up for suggesting a follow-up to the user in a specified situation. The follow-up may include, for example, a following utterance. According to an embodiment, the capsule DB 323 may include a layout registry that stores layout information about information output through the user terminal 301. According to an embodiment, the capsule DB 323 may include a vocabulary registry that stores vocabulary information included in capsule information. According to an embodiment, the capsule DB 323 may include a dialog registry that stores information about a dialog (or interaction) with the user.

According to an embodiment, the capsule DB 323 may update a stored object through a developer tool. The developer tool may include, for example, a function editor for updating an action object or a concept object. The developer tool may include a vocabulary editor for updating vocabulary. The developer tool may include a strategy editor for generating and registering a strategy for determining a plan. The developer tool may include a dialog editor that generates a dialog with the user. The developer tool may include a follow-up editor capable of activating a following target and editing a following utterance providing a hint. The following target may be determined based on a currently set target, user preference, or an environmental condition.

According to an embodiment, the capsule DB 323 can also be implemented in the user terminal 301. That is, the user terminal 301 may include the capsule DB 323 that stores information for determining an operation corresponding to a voice input.

According to an embodiment, the execution engine 324 may produce a result using the generated plan. According to an embodiment, the end user interface 325 may transmit the produced result to the user terminal 301. Accordingly, the user terminal 301 may receive the result and may provide the received result to the user. According to an embodiment, the management platform 326 may manage information used in the intelligent server 302. According to an embodiment, the big data platform 327 may collect user data. According to an embodiment, the analytic platform 328 may manage the quality of service (QoS) of the intelligent server 302. For example, the analytic platform 328 may manage a component and the processing speed (or efficiency) of the intelligent server 302.

According to an embodiment, the service server 303 may provide a designated service (e.g., a food delivery service or a hotel reservation service) to the user terminal 301. According to an embodiment, the service server 303 may be a server operated by a third party. For example, the service server 303 may include a first service server 331, a second service server 332, and a third service server 333 that are operated by different third parties. According to an embodiment, the service server 303 may provide information for generating a plan corresponding to a received voice input to the intelligent server 302. The provided information may be stored, for example, in the capsule DB 323. In addition, the service server 303 may provide result information according to the plan to the intelligent server 302.

In the foregoing integrated intelligent system 300, the user terminal 301 may provide various intelligent services to the user in response to a user input. The user input may include, for example, an input through a physical button, a touch input, or a voice input.

In an embodiment, the user terminal 301 may provide a voice recognition service through an intelligent application (or voice recognition application) stored therein. In this case, for example, the user terminal 301 may recognize a user utterance or a voice input received through the microphone and may provide a service corresponding to the recognized voice input to the user.

In an embodiment, the user terminal 301 may perform a designated operation alone or together with the intelligent server 302 and/or the service server 303, based on the received voice input. For example, the user terminal 301 may execute an application corresponding to the received voice input and may perform the designated operation through the executed application.

In an embodiment, when the user terminal 301 provides a service together with the intelligent server 302 and/or the service server 303, the user terminal 301 may detect a user utterance using the microphone 312 and may generate a signal (or voice data) corresponding to the detected user speech. The user terminal 301 may transmit the voice data to the intelligent server 302 using the communication interface 311.

According to an embodiment, the intelligent server 302 may generate, as a response to voice input received from the user terminal 301, a plan for performing a task corresponding to the voice input or a result of performing an operation according to the plan. The plan may include, for example, a plurality of operations for performing the task corresponding to the user's voice input and a plurality of concepts related to the plurality of operations. The concepts may define a parameter input to execute the plurality of operations or a result value output by executing the plurality of operations. The plan may include information about an association between the plurality of operations and the plurality of concepts.

According to an embodiment, the user terminal 301 may receive the response using the communication interface 311. The user terminal 301 may output an audio signal generated inside the user terminal 301 to the outside using the speaker 313 or may output an image generated inside the user terminal 301 to the outside using the display 314.

Figure 4:
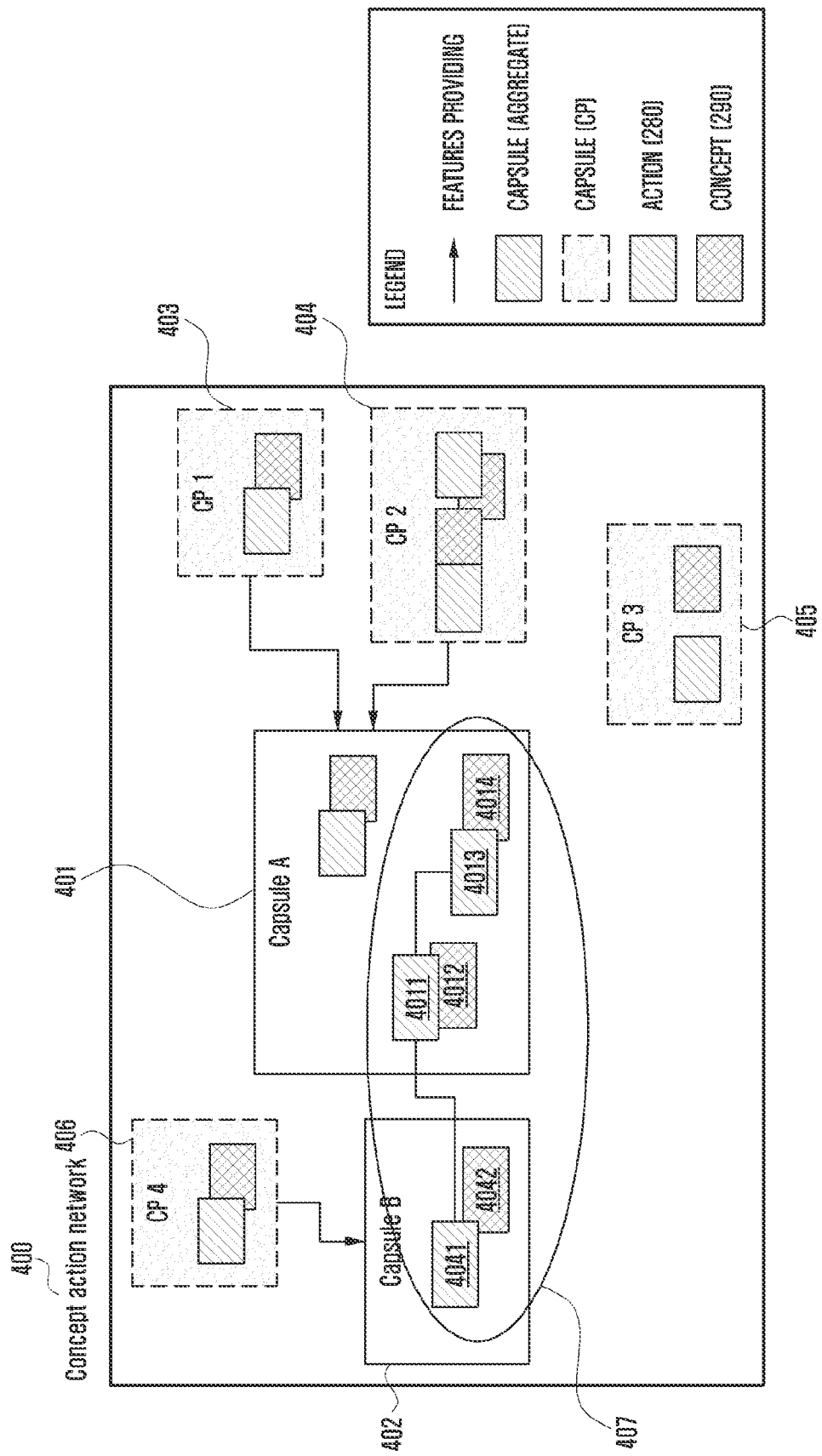
FIG. 4 is a diagram illustrating a form in which relation information between a concept and an action is stored in a database, according to an embodiment.

FIG. 4 illustrates a form in which information about a relationship between a concept and an action is stored in a database according to various embodiments.

A capsule DB (e.g., the capsule database DB 323) of the intelligent server 302 may store a capsule in the form of a concept action network (CAN) 400. The capsule DB may store an operation of processing a task corresponding to a voice input from a user and a parameter required for the operation in the form of a concept action network (CAN). The CAN may show a systematic relationship between an action and a concept defining a parameter required to perform the action.

The capsule DB may store a plurality of capsules (e.g., capsule A 401 and capsule B 402) respectively corresponding to a plurality of domains (e.g., applications). According to an embodiment, one capsule (e.g., capsule A 401) may correspond to one domain (e.g., application). Further, one capsule may correspond to at least one service provider (e.g., CP 1 403, CP 2 404, CP 3 405, or CP 4 406) for performing a function for a domain related to the capsule. According to an embodiment, one capsule may include at least one action 410 and at least one concept 420 for performing a specified function.

According to an embodiment, the natural language platform 322 may generate a plan for performing a task corresponding to a received voice input using a capsule stored in the capsule DB. For example, the planner module 322c of the natural language platform 322 may generate the plan using the capsule stored in the capsule DB. For example, the planner module 322c may generate a plan 407 using actions 4011 and 4013 and concepts 4012 and 4014 of capsule A 401 and an action 4041 and a concept 4042 of capsule B 402.

Figure 5:
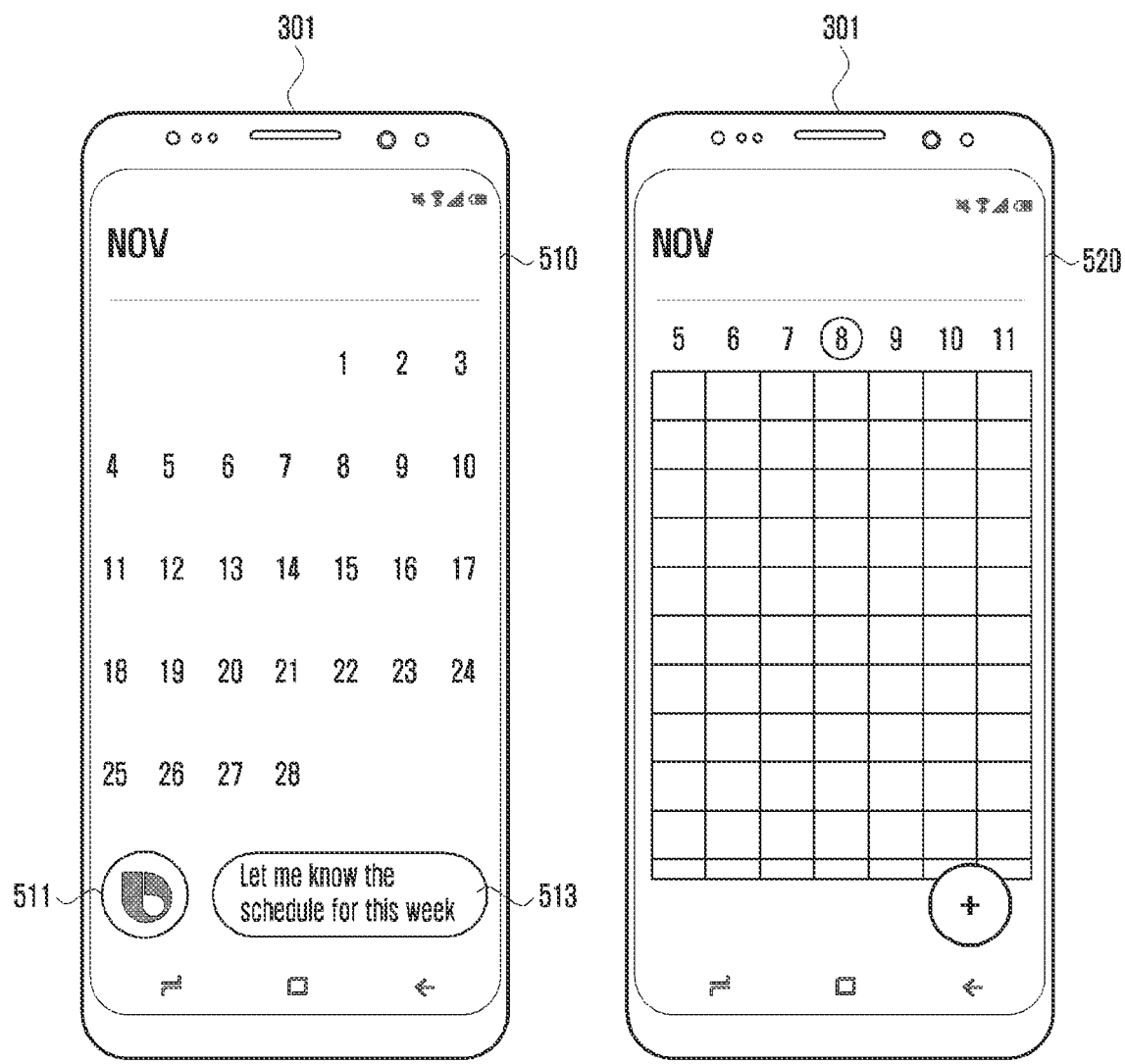
FIG. 5 is a diagram illustrating a screen in which a user terminal processes a voice input received through an intelligent app, according to an embodiment.

FIG. 5 illustrates a screen for a user terminal to process a received voice input through an intelligent application according to various embodiments.

The user terminal 301 may execute an intelligent application to process a user input through the intelligent server 302.

According to an embodiment, when recognizing a designated voice input (e.g., Wake up!) or receiving an input via a hardware key (e.g., a dedicated hardware key), the user terminal 301 may execute the intelligent application for processing the voice input on screen 510. For example, the user terminal 301 may execute the intelligent application in a state in which a schedule application is executed. According to an embodiment, the user terminal 301 may display an object (e.g., an icon) 511 corresponding to the intelligent application on the display 314. According to an embodiment, the user terminal 301 may receive a voice input based on a user utterance. For example, the user terminal 301 may receive a voice input "Tell me the schedule for this week!" According to an embodiment, the user terminal 301 may display a UI (e.g., an input window) 513 of the intelligent application displaying text data of the received voice input on the display.

According to an embodiment, the user terminal 301 may display a result corresponding to the received voice input on screen 520 on the display. For example, the user terminal 301 may receive a plan corresponding to the received user input and may display "Schedule for this week" according to the plan on the display.

Figure 6:
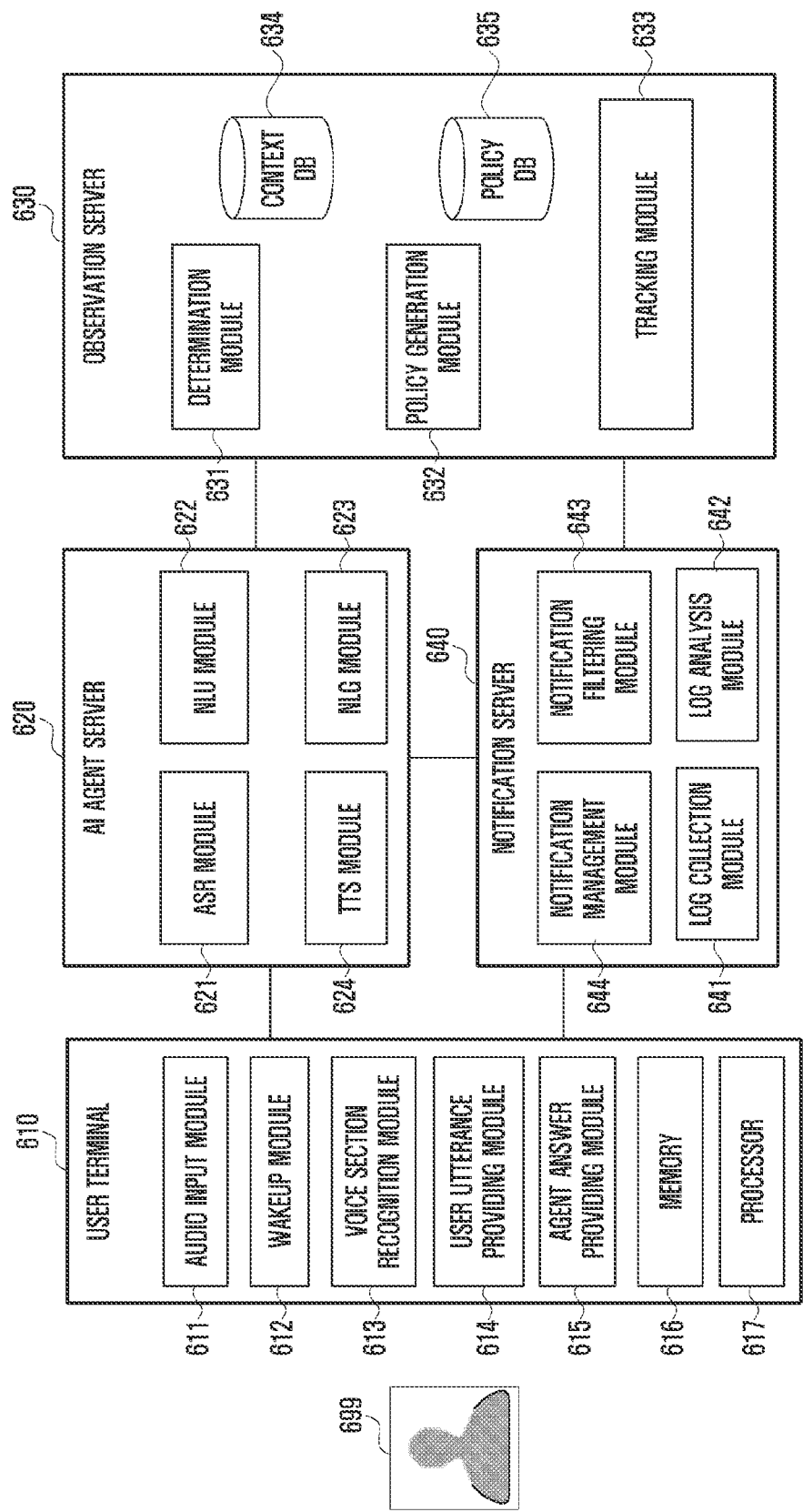
FIG. 6 is a block diagram illustrating an integrated intelligence system configured to provide an answer of an AI agent to a user, based on a user utterance, according to an embodiment.
Figure 7:
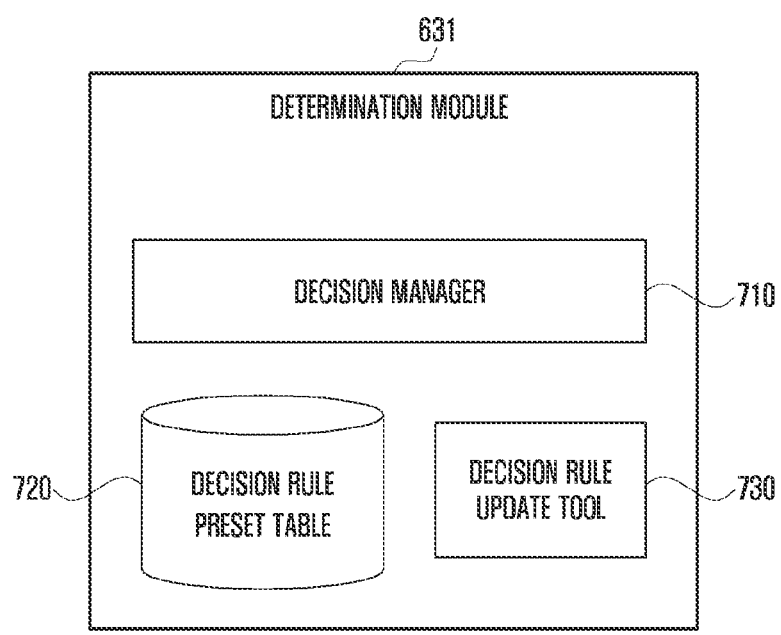
FIG. 7 is a diagram illustrating a detailed structure of a determination module (or decision maker) for determining whether an additional answer of an agent is required in the system of FIG. 6, according to an embodiment.
Figure 8:
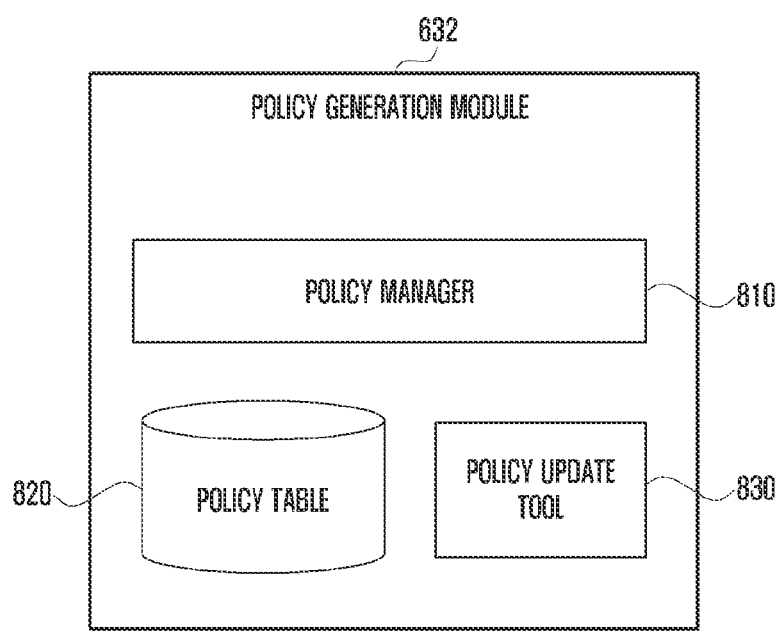
FIG. 8 is a diagram illustrating a detailed structure of a policy generation module (or criteria maker) for generating a policy for an additional answer of an agent in the system of FIG. 6, according to an embodiment.
Figure 9:
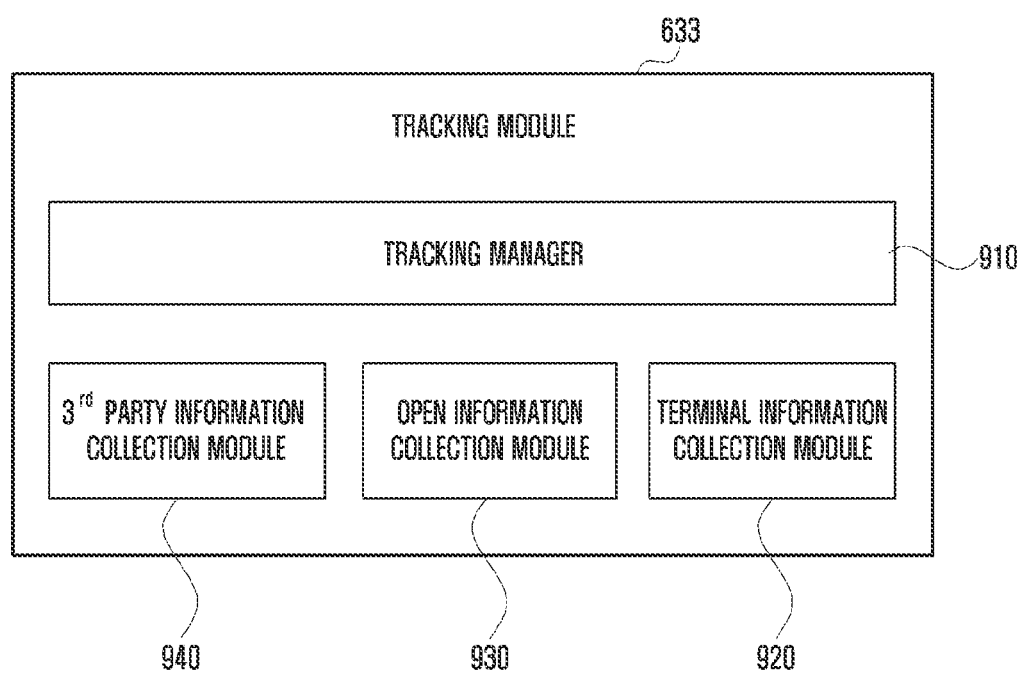
FIG. 9 is a diagram illustrating a detailed structure of a tracking module (or information tracker) for tracking data in accordance with a policy generated in the system of FIG. 6, according to an embodiment.
Figure 10:
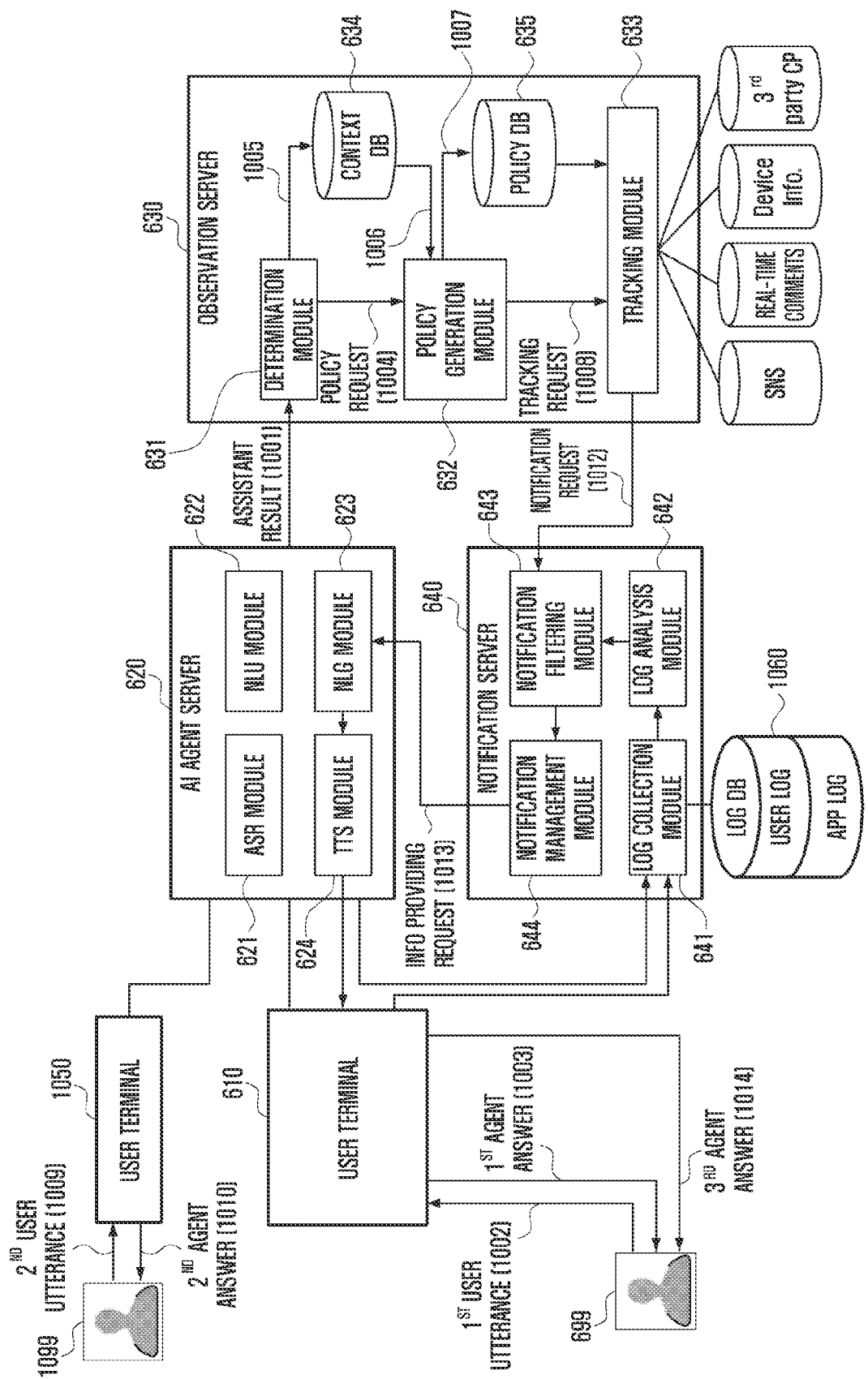
FIG. 10 is a diagram illustrating operations performed in the system of FIG. 6, according to an embodiment.

FIG. 6 is a block diagram illustrating an integrated intelligence system configured to provide an answer of an AI agent to a user, based on a user utterance, according to an embodiment. FIG. 7 is a diagram illustrating a detailed structure of a determination module (or decision maker) for determining whether an additional answer of an agent is required, in the system of FIG. 6, according to an embodiment. FIG. 8 is a diagram illustrating a detailed structure of a policy generation module (or criteria maker) for generating a policy for an additional answer of an agent, in the system of FIG. 6, according to an embodiment. FIG. 9 is a diagram illustrating a detailed structure of a tracking module (or information tracker) for tracking data in accordance with a policy generated, in the system of FIG. 6, according to an embodiment. FIG. 10 is a diagram illustrating operations performed in the system of FIG. 6, according to an embodiment.

With reference to FIGS. 6 to 10, the integrated intelligence system 600 (e.g., the integrated intelligence system 300 in FIG. 3) may include a user terminal 610, an AI agent (or assistant) server 620, an observation server 630, and/or a notification (push) server 640. The user terminal 610 (e.g., the user terminal 301 in FIG. 3) may include an audio input module 611, a wakeup module 612, a voice section recognition module 613, a user utterance providing module 614, and an agent answer providing module 615, a memory 618, and/or a processor 619. The AI agent server 620 (e.g., the intelligent server 302 in FIG. 3) may include an ASR module 621, an NLU module 622, an NLG module 623, and/or a TTS module 624. The observation server 630 may include a determination module 631, a policy generation module 632, a tracking module 633, a context database 634, and/or a policy (or criteria) database 635. The notification server 640 may include a log collection module 641, a log analysis module 642, a notification filtering module 643, and/or a notification management module 644.

The audio input module 611 may receive an audio signal. For example, the audio input module 611 may receive an audio signal from a microphone configured in the input module 150 in FIG. 1. The audio input module 611 may receive an audio signal from an external device (e.g., a headset or a microphone) connected wiredly through an audio connector configured in the connection terminal 178 in FIG. 1. The audio input module 611 may receive an audio signal from an external device connected wirelessly (e.g., Bluetooth™ communication) to the user terminal 610 through a wireless communication circuit (e.g., the wireless communication module 192 in FIG. 1).

The wakeup module 612 may recognize that a user 699 calls an AI agent (or voice assistant). The wakeup module 612 may receive an audio signal from the audio input module 611 and recognize an utterance (e.g., "Hi Bixby") designated to call the AI agent in the received audio signal. For example, the wakeup module 612 may detect a starting point and an endpoint of a user's utterance in the audio signal and thereby acquire a portion (e.g., a first portion corresponding to "Hi" and a second portion corresponding to "Bixby") of the audio signal in which the user's utterance exists. The wakeup module 612 may compare the acquired utterance portion with previously stored voice data and thereby determine whether a call utterance (or a driving utterance) is included in the audio signal. The wakeup module 612 may support the user 699 to call the AI agent by a method other than voice. The wakeup module 612 may recognize an input (e.g., two consecutive presses) to a physical key (e.g., a power key) of the input module 150 as a call. In addition, the wakeup module 612 may recognize a touch input received from a touch circuit of the display module 160 as a call.

The voice section recognition (or voice activity detection (VAD)) module 613 may recognize a voice section in the audio signal received from the audio input module 611 in response to the AI agent call. The VAD module 613 may recognize the voice section in the audio signal by using a VAD model (e.g., a convolutional neural network (CNN) model or a recurrent neural network (RNN) model) learned using an AI algorithm. The VAD module 613 may enter an audio signal as an input value into the VAD model in units of frames (e.g., about 20 ms) and obtain a result value from the VAD model. The result value may include a predictive value indicating whether an input audio frame is a voice frame. When the audio frame inputted into the VAD model is a voice frame, the VAD module 613 may recognize whether the voice frame is a starting point of the voice section, an endpoint of the voice section, or within the voice section, based on predicted values outputted from the VAD model. A first audio frame, a second audio frame, and a third audio frame may be sequentially inputted into the VAD model, and a first predictive value, a second predictive value, and a third predictive value may be sequentially outputted from the VAD model. If the first predictive value indicates that there is no voice in the first audio frame, the second predictive value indicates that there is a voice in the second audio frame, and the third predictive value indicates that there is a voice in the third audio frame, the VAD module 613 may recognize the second audio frame as the starting point of the voice section and recognize the third audio frame as a frame within the voice section. If the first predictive value indicates that there is a voice in the first audio frame, and the second predictive value indicates that there is no voice in the second audio frame, the VAD module 613 may recognize the second audio frame as the endpoint of the voice section.

The user utterance providing module 614 may transmit, in response to the AI agent call, the audio signal (or voice signal corresponding to the user's utterance) within the voice section recognized by the VAD module 613 to the AI agent server 620 through a communication circuit (e.g., the communication module 190 in FIG. 1).

The agent answer providing module 615 may receive a voice signal, as an answer (or response) of the AI agent, from the AI agent server 620 through the communication circuit and provide the received voice signal to the user 699. The agent answer providing module 615 may output the agent's voice signal to a speaker configured in the sound output module 155 of FIG. 1. The agent answer providing module 615 may also output the agent's voice signal to an external device (e.g., a headset or speaker) connected wiredly through the audio connector configured in the connection terminal 178 of FIG. 1. The agent answer providing module 615 may also output the agent's voice signal to an external device connected wirelessly (e.g., Bluetooth™ communication) to the user terminal 610 through a wireless communication circuit (e.g., the wireless communication module 192 in FIG. 1). The agent answer providing module 615 may provide the AI agent's answer (or response) in the form of a visual object such as text through the display module 160.

At least one of the above modules 611 to 615 may be stored as instructions in the memory 618 (e.g., the memory 130 in FIG. 1) and executed by the processor 619 (e.g., the processor 120 in FIG. 1). At least one of the above modules 611 to 615 may be executed by a processor (e.g., the auxiliary processor 123) specialized in processing an AI model.

The ASR module 621 (e.g., the automatic speech recognition module 332a in FIG. 3) may convert a voice signal, received from the user terminal 610 through a communication circuit (e.g., the front end 321 in FIG. 3) of the AI agent server 620, into text data.

The NLU module 622 (e.g., the natural language understanding module 332b in FIG. 3) may understand the intent uttered by the user 699 by using the text data received from the ASR module 621. The NLU module 622 may understand what information the user 699 has queried or requested or what function or service the user 669 has commanded to execute.

The NLG module 623 (e.g., the natural language generator module 332d in FIG. 3) may generate an answer (or response) of the AI agent, based on the user's intent understood by the NLU module 622. The NLG module 623 may generate an agent's answer to a query or request of the user 699, based on a knowledge database (e.g., a database configured in the service server 303 in FIG. 3). The NLG module 623 may search the Internet for information queried or requested by the user 699 and understood by the NLU module 622, and generate an agent's answer (e.g., including retrieved information) based on retrieved information. The agent's answer may be transmitted in a text form to the user terminal 610 through the communication circuit of the AI agent server 620 and then outputted through a display (e.g., the display 314 in FIG. 3). In addition, the agent's answer may be converted into a voice signal by the TTS module 624 (e.g., the text-to-speech module 332e in FIG. 3). The voice signal may be transmitted to the user terminal 610 through a communication circuit and then outputted through a speaker (e.g., the speaker 313 in FIG. 3).

The AI agent server 620 may understand a user's utterance, generate an agent's answer (or response) based on the understanding, and generate an assistant result 1001 to be provided to the observation server 630 by using the user's utterance and the agent's answer. If the user's utterance is "tell me about this week's Tottenham match schedule", the NLU module 622 may understand from voice data of "tell me" the attribute of the user's utterance as an information request, and also understand from voice data of "match schedule" what the user wants to know (a user's intent). The NLU module 622 may understand slots related to the user's intent from voice data of "this week" and "Tottenham" as "date range" and "soccer team". The NLG module 623 may search the Internet for information to be notified to the user, based on the user's intent and slots understood by the NLU module 622, and generate the agent's answer, based on first information (e.g., a match date and/or opposing team) obtained as a result of the search. Based on the results outputted from the NLU module 622 and the NLG module 623, the AI agent server 620 may generate an assistant result. The assistant result may include, for example, data (e.g., MatchSchedule) indicating the user's intent, data (e.g., information_req) indicating the attribute (dialog_act) of the user's utterance, user's utterance data (e.g., "tell me this week's Tottenham match schedule"), data (e.g., "2020-10-05~2020-10-11" and/or "Tottenham") indicating the slots (date_range, team), first information (e.g., "Manchester United" and/or "2020-10-08") provided to the user as an answer (or response) to the user's information request, a parameter (e.g., "opposing_team" and/or "match_date") indicating the attribute of the first information, and/or data indicating the source of the first information (data_fetch_source). The NLU module 622 may configure the assistant result in a format as illustrated in Table 1 below and transmit it to the determination module 631.

TABLE 1

Assistant result

{
"intent": "MatchSchedule",
"dialog_act": "information_req",

TABLE 1-continued

Assistant result

"utterance": "Tell me this week's Tottenham match schedule"
"slots": {
  "date-range": "2020-10-05 ~ 2020-10-11",
  "team": "Tottenham"
},
"data_fetch_source": {
  "type": "3$^{rd}$partyCP",
  "endpoint": http://epl-data/MatchSchedule
},
"data": {
  "opposing_team": "Manchester United",
  "match_date": "2020-10-08",
  "status": "scheduled"
}
}

The determination module 631 may determine, based on the assistant result 1001 of the AI agent server 620, whether the first information provided to the user 699 is information that needs to be updated. The first information may be information included in an answer initially provided to the user 699 by the AI agent server 620 in response to the user's utterance, or information included in an answer additionally provided to the user 699 after the initial answer. If it is determined that the first information needs to be updated, the determination module 631 may request 1004 the policy generation module 632 to generate a policy for tracking second information as update information of the first information.

The determination module 631 may receive the assistant result 1001 from the AI agent server 620. In addition, the determination module 631 may receive from the AI agent server 620 the assistant result 1001 that includes the intent, slot, and attribute (e.g., an information request, a command to execute a service or function, and/or a chitchat) of the first user utterance 1002 identified by the AI agent server 620, and a parameter indicating the attribute of the first information provided to the user in response to the first user utterance 1002. The determination module 631 may receive from the AI agent server 620 the assistant result 1001 including the first information in a first agent answer 1003 provided to the user 699 by the AI agent server 620 in response to the first user utterance 1002. The determination module 631 may perform an operation 1005 of storing the assistant result 1001 in the context database 634. The determination module 631 may add the assistant result 1001 to the context database 634 organized by an item as illustrated in Table 2. For example, the determination module 631 may extract a match schedule, a team, an information request, a scheduled match date, match detailed information (e.g., a player list), "2020-00-00" from the assistant result 1001 and then add them to respective items in the database.

TABLE 2

| User intent | Slot | Attribute | Parameter | 1$^{st}$ information provided to user | Update |
|---|---|---|---|---|---|
| MatchSchedule | Team | information_req | Match ID, Scheduled match date, Match detailed information | 2020-00-00 | Need |

TABLE 2-continued

| User intent | Slot | Attribute | Parameter | 1st information provided to user | Update |
|---|---|---|---|---|---|
| WeatherInfo | City | information_req | Temperature, rainfall, snowfall, fine dust concentration, weather events | 00 degrees | Need |
| StockInfo | Company | information_req | Stock price | 0000 | Need |
| . . . | . . . | . . . | . . . | . . . | . . . |

The determination module 631 may determine, based on the intent and attribute information in the assistant result 1001, whether the first user utterance 1002 is an informational utterance requesting information (in other words, a request utterance). For example, if the user intent is an intention of a specified type (e.g., a schedule, weather and/or stock) and the attribute is an information request, the determination module 631 may determine the first user utterance 1002 as an informational utterance.

The determination module 631 may include a decision manager 710, a decision rule preset table 720, and a decision rule update tool 730. When the first user utterance 1002 is determined to be an informational utterance, the decision manager 710 may compare the assistant result 1001 with the decision rule preset table 720 (e.g., Table 3 below). As a result of the comparison, the decision manager 710 may confirm that the parameter of the type (e.g., a date, temperature, probability, and/or price) defined in the decision rule preset table 720 exists the assistant result 1001 (e.g., the parameter indicating the attribute of the first information provided to the user). If the parameter of the predefined type exists in the assistant result 1001, the decision manager 710 may determine that the first information provided to the user 699 needs to be updated. Additionally, the determination module 631 may confirm that the first information corresponding to the parameter recognized in the assistant result 1001 is configured in the predefined format. When the parameter of the predefined type exists in the assistant result 1001 and the first information corresponding to that parameter is configured in the predefined format, the decision manager 710 may determine that the first information provided to the user 699 needs to be updated. The decision rule update tool 730 may record in the context database 634 a value indicating that the first information needs to be updated.

TABLE 3

| Type | Format | Parameter | Description |
|---|---|---|---|
| Date | YYYY-MM-DD YYYY-MM-DD~YYYY-MM-DD YYYY-MM-DDHH:MM:SS YYYY-MM-DD~ | Scheduled match date | Time expression containing the date, duration, etc. of a specific event |
| | | Social distancing step 2.5 period SW release date CSAT date | |
| Temperature | {NUMBER}° C. {NUMBER}° F. | Temperature | Temperature representation in Fahrenheit, Celsius, etc. |

TABLE 3-continued

| Type | Format | Parameter | Description |
|---|---|---|---|
| Probability | {NUMBER}% | Body temperature Air temperature Rainfall probability Humidity Snowfall probability | Expression of possibility |
| Price | {NUMBER}\ {NUMBER}$ {NUMBER}元 {NUMBER}¥ | Stock price Exchange rate Virtual currency Oil price | Expression of variable price |
| . . . | . . . | . . . | . . . |

When the determination module 631 determines that the first information needs to be updated, the policy generation module 632 may retrieve 1006 the assistant result 1001 from the context DB 634. Using the retrieved assistant result 101, the policy generation module 632 may generate a policy indicating what update information (or second information) should be tracked and notified to the user. The policy generation module 632 may store 1007 the generated policy in the policy DB 635 and request 1008 the tracking module 633 to track the second information.

The policy generation module 632 may refer to the assistant result 1001 (e.g., an intent, slot, and parameter) obtained from the context DB 634 and generate a policy by using the reference result. As shown in Table 4 below, the policy may include, for each user intent, an identifier indicating secondary information to be tracked (e.g., key information and/or sub information), a time period to be tracked (e.g., a polling cycle), a frequency of tracking, and a condition for terminating tracking. The policy generation module 632 may refer to "match schedule" as the user intent and "scheduled match date" as the parameter in the assistant result 1001. The policy generation module 632 may determine the "scheduled match date" as key information to be tracked, and add the key information to the policy. The policy generation module 632 may add the tracking frequency, tracking period, and tracking termination condition, preset according to the user intent, to the policy. The policy generation module 632 may determine, by using the slot and the parameter, sub information to be tracked. If the user 699 utters "tell me the stock price of Samsung Electronics", the policy generation module 632 may determine, as keywords necessary to provide the sub information, the parameter "stock price" indicating information to be found and the slot "Samsung Electronics" related to the stock price (parameter), and add the sub information to the policy. The tracking module 633 may identify the key information in the policy and track the key information "the stock price of Samsung Electronics". The tracking module 633 may identify the sub information in the policy and track information (e.g., news and/or SNS real-time comments) related to "the stock price of Samsung Electronics". The tracking module 633 may provide the updated stock price and related information to the user terminal 610 through the servers 620 and 640.

generation module 632 may generate a policy based on the assistant result corresponding to the second user utterance 1009 and store it in the policy DB 635. Thereafter, upon receiving the request 1004, the policy generation module 632 may check policies stored in the policy DB 635 and thereby determine whether the request 1004 is substantially the same as previously received request. For example, the

TABLE 4

| Intent | Policy | Tracking frequency | Tracking period | Tracking termination condition | Key information | Sub information |
|---|---|---|---|---|---|---|
| Match schedule | DayBefore Event NearerEventTime | Daily | MatchDate - Today < 1 d MatchTime - Now < 1 h | EndOfEvent | Scheduled match date (time), Match detailed information | Team name, Scheduled match date |
| Weather information | Propinquity, PartOfDay(Morning/ Afternoon/ Evening . . . ) | SpecificTime | TimePoints = [8:00 AM, 13:00 PM, 22:00 PM] | VisitiedLocation | Temperature, Key weather event (rainy season, typhoon, heavy rain, etc.) | City temperature |
| Stock information | StartMarket, EndMarket | Daily | EventTime = {"start": "09:30 AM", "end": "16:00 PM"} | ExplicitCancel | Stock price | Company stock price |

If there is a difference between the first information provided to the user 699 and information obtained by tracking, the policy generation module 632 may add, to the policy, a difference value indicating whether the obtained information has worth as the second information to be notified to the user, and store it in the policy DB 635. For example, as shown in Table 5, an entity and a difference value may be defined and added to the corresponding policy as types of information to be tracked for each user intent.

TABLE 5

| Entity | User intent | Difference value |
|---|---|---|
| Time Prediction | Match schedule | Cancel, postpone, location change |
| | Weather information | Rainfall, snowfall, fine dust, temperature change of 5 degrees or more |
| | Traffic information | Traffic accidents, increase/congestion of vehicles |
| Dynamic value | Stock information | AM 09:00 stock price |
| | Current match state | Goal, red card, substitution |
| Not open information | Match lineup | Match lineup |
| | Product information | New product specifications, design |

The policy generation module 632 may determine whether the request 1004 is a duplicate request for generating the same policy as the already generated policy. When it is determined as a duplicate request, the policy generation module 632 may not respond to the request 1004, and when it is determined that the request 1004 is a new request, the policy generation module 632 may generate a policy in response to the request 1004. Before the first user utterance 1002, the other user terminal 1050 may receive a similar utterance 1009 (hereinafter, referred to as a second user utterance) of the other user 1099. The user terminal 1050 may provide the other user 1099 with a second agent answer 1010 substantially similar to the first agent answer 1003. The user terminal 1050 may transmit a voice signal in the second user utterance 1009 to the AI agent server 620. The policy policy generation module 632 may determine that the policy generated based on the second user utterance 1009 corresponds to the request 1004, and accordingly may not respond to the request 1004.

The policy generation module 632 may include a policy manager 810, a policy table 820, and a policy update tool 830. The policy table 820 may include policies predefined for each user intent. The policy manager 810 may retrieve policies from the predefined policy table 820, compare the retrieved policies with the request 1004, and thereby identify the policy corresponding to the request 1004 in the policy table 820. The policy manager 810 may determine through the policy DB 635 whether the same policy as the identified policy corresponding to the request 1004 exists. If the same policy exists in the policy DB 635 (i.e., when the request 1004 is determined as a duplicate request), the policy manager 810 may not respond to the request 1004. If the identified policy corresponding to request 1004 is not in the policy DB 635 (i.e., when the request 1004 is determined as a new request), the policy manager 810 may respond to the request 1004 and thereby add the identified policy corresponding to request 1004 to the policy DB 635 through the policy update tool 830.

The tracking module 633 may retrieve 1011 the policy from the policy DB 635 in response to the tracking request 1008 and then, from the retrieved policy, recognize the tracking frequency, the tracking period, the tracking termination condition, and the information to be tracked. The tracking module 633 may search the Internet for information (e.g., an SNS, real-time comments, device information, and/or a 3rd party contents provider (CP)) according to the recognized tracking frequency and tracking period. If the information obtained as a result of the search is different from the first information, the tracking module 633 may determine the obtained information as the second information (the updated information) to be notified to the user. The tracking module 633 may transmit the second information to the notification server 640 and thereby request 1012 a notification.

The tracking module 633 may identify information (e.g., the key information and/or the sub information) to be tracked in the policy and search the Internet for the information. The tracking module 633 may determine, based on the difference value as shown in Table 4, whether the retrieved information is the second information worth notifying to the user 699. For example, if the first user utterance 1002 is "when is the Samsung game this week?", the user intent recognized by the AI agent server 620 may be "match schedule", the entity as the type of information to be tracked may be "time", and the first information in the first agent answer 1003 provided to the user by the AI agent server 620 may be "YYYY-MM-DD, city XX". The tracking module 633 may identify "cancel, postpone, and location change" in the policy DB 635 as the difference value corresponding to the match schedule (user intent) and time (entity). The tracking module 633 may determine the worth of the retrieved information, based on the identified difference value and the first information. If the difference between the retrieved information and the first information corresponds to "match cancel", "change of day", or "change of location", the tracking module 633 may determine the retrieved information as the second information worth notifying to the user 699.

The tracking module 633 may include a tracking manager 910, a terminal information collection module 920, an open information collection module 930, and a third party information collection module 940. The tracking manager 910 may identify information to be tracked in the policy DB 635 and manage the collection modules 920, 930, and 940 to collect information according to the tracking frequency and tracking period. The tracking manager 910 may obtain the second information worth notifying to the user 699 from the information collected by the collection modules 920, 930, and 940, and request the notification server 640 to notify the second information. The terminal information collection module 920 may collect information (e.g., location information) of the user terminal 610 and thereby detect a change in the user's surrounding environment and/or the state of the user terminal 610. The open information collection module 930 may detect a change in information related to a user's interest from information published on the Internet, such as weather, traffic, games, news, or SNS. The third party information collection module 940 may collect information about content provided by a third party.

The log collection module 641 may collect user log information related to the user 699 and application log information related to a usage record for an application installed in the user terminal 610 from the user terminal 610 and/or the AI agent server 620 and store them in the log DB 1060. The log collection module 641 may collect, as the user log information, information related to the content, time, and place of a dialog with the AI agent by the user 699 from the AI agent server 620. The log collection module 641 may collect a visit record (e.g., a location of a visited place and a time spent) of the user 699 for a designated place from the user terminal 610. The log collection module 641 may collect personal information of the user 699 from the user terminal 610 and/or the AI agent server 620. The log collection module 641 may collect information about a user's hobby or preferred contents (e.g., a preferred food, movie, music, and/or sport) from a user profile associated with a user account used when the user terminal 610 logs in to the AI agent server 620. The log collection module 641 may collect, as the application log information, usage records (e.g., content used, time of use, and/or frequency of use) for applications installed in the user terminal 610 and Internet usage records (e.g., information about a visited site, a visit time, and/or a search word) from user account information stored in the user terminal 610 and/or the AI agent server 620.

The log analysis module 642 may check the log DB 1060 through the log collection module 641. From the log DB 1060, the log analysis module 642 may extract log information that can be used to determine the validity of the second information. The log analysis module 642 may extract search records, dialog contents (e.g., informational utterances) with the AI agent, main keywords in user utterances, or preference information from the log DB 1060. The log analysis module 642 may transmit the extracted information to the notification filtering module 643.

The notification filtering module 643 may receive the second information from the tracking module 633 through the notification request 1012. Based on log information received from the user terminal 610 through the log analysis module 642, the notification filtering module 643 may determine whether the second information is valid information to be notified to the user. If the second information is valid information as a result of the determination, the notification filtering module 643 may transmit the second information to the notification management module 644.

Based on the Internet usage history (e.g., search history) and/or the dialog contents, the notification filtering module 643 may determine whether the second information is invalid information that does not need to be provided because the user 699 knows it or valid information that needs to be notified because the user 699 does not know it. For example, the notification filtering module 643 may confirm that information corresponding to (e.g., matching) the second information is included in the Internet usage records and/or the dialog contents. Then, the notification filtering module 643 may not respond to the notification request 1012. If it is determined that the second information is valid information that the user 699 does not know, the notification filtering module 643 may transmit the second information to the notification management module 644.

Based on the main keyword and/or the preference information of the user 699, the notification filtering module 643 may determine whether a parameter (e.g., soccer) indicating the attribute of the second information is valid information that needs to be notified because the user 699 prefers it or invalid information that does not need to be notified because the user 699 does not prefer it. For example, the user 699 may query the AI agent about "OO soccer game schedule", and then the AI agent may inform the user 699 about the OO soccer match date as the first information. Thereafter, the notification filtering module 643 may receive a changed match date as the second information from the tracking module 633 through the notification request 1012. If the preference information includes soccer (parameter) related information or if the main keyword includes soccer (parameter) related information, the notification filtering module 643 may transmit the second information to the notification management module 644. The main keyword may be a word (e.g., soccer and/or soccer team name) that appears frequently more than a specified number of times during a specified period (e.g., a month) in a dialog between the user 699 and the AI agent. If the preference information or the main keyword does not include soccer (parameter) related information, the notification filtering module 643 may not respond to the notification request 1012.

When the notification filtering module 643 confirms the validity of the second information, the notification management module 644 may request 1013 the AI agent server 620 to provide the second information to the user 699 by transmitting the second information to the AI agent server 620. In response to the request 1013, the AI agent server 620 may generate a third agent answer 1014 for voice guidance of the second information to the user 699 by using the NLG module 623. The third agent answer 1014 may be converted into a voice signal through the TTS module 624 and delivered to the user 699 through the user terminal 1014.

The above-described modules 621, 622, 623, 624, 631, 632, 633, 641, 642, 643, and 644 may be integrated into one electronic device. For example, the modules 621, 622, 623, 624, 631, 632, 633, 641, 642, 643, and 644 may be stored as instructions in the memory of the AI agent server 620 and executed by the processor of the intelligent server 302.

At least one of the modules 621, 622, 623, 624, 631, 632, 633, 641, 642, 643, and 644 may be implemented in the user terminal 610. For example, the ASR module 621 and the TTS module 624 may be provided in the user terminal 610.

Figure 11:
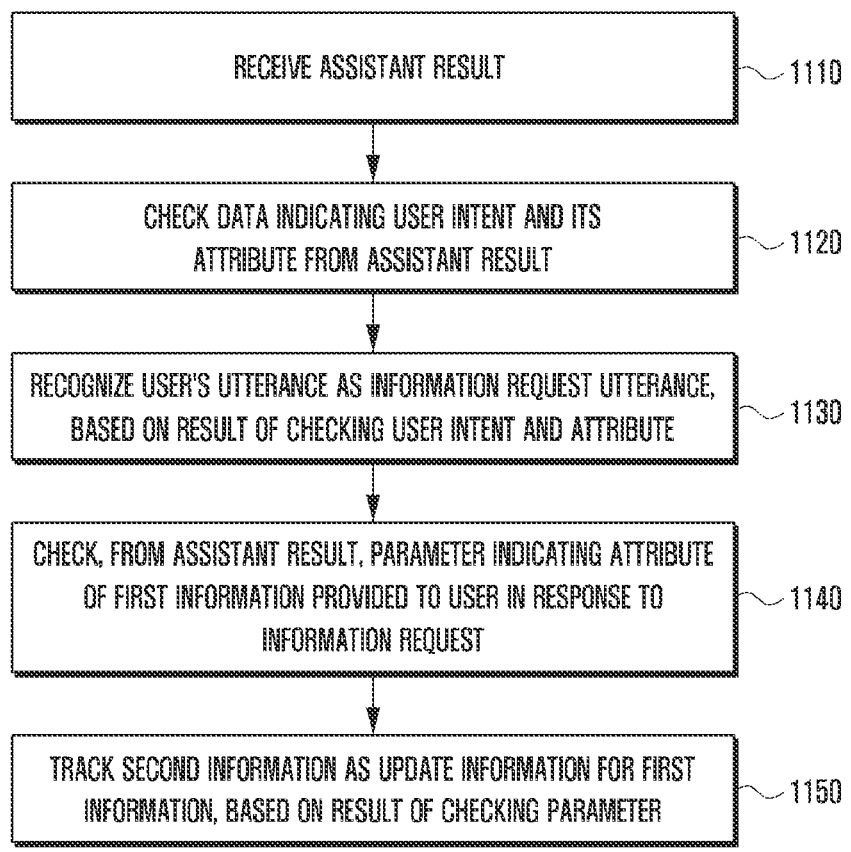
FIG. 11 is a flow diagram illustrating operations performed by the observation server of FIG. 6, according to an embodiment.

FIG. 11 is a flow diagram illustrating operations performed by the observation server 630, according to an embodiment. The operations of FIG. 11 may be performed by a processor of the observation server 630 using at least one of the modules 631, 632, and 633 shown in FIG. 6.

At operation 1110, the processor may receive the assistant result 1001 from the AI agent server 620. For example, the observation server 630 may receive the assistant result configured in the format shown in Table 1.

At operation 1120, the processor may check data indicating the user intent and data indicating the attribute of the user intent from the assistant result.

At operation 1130, based on the result of checking the user intent and attribute, the processor may recognize a user's utterance corresponding to the assistant result as an information request utterance (informational utterance). For example, when the user intent is a schedule (e.g., a game schedule) and the attribute is an information request, the observation server 630 may recognize the user's utterance as the informational utterance.

At operation 1140, as the user's utterance is recognized as the informational utterance, the processor may check, from the assistant result, a parameter indicating the attribute of the first information provided to the user in response to the information request.

At operation 1150, the processor may track the second information as update information for the first information, based on the result of checking the parameter. For example, if the parameter is a predetermined type (e.g., a date, temperature, probability, or price), the observation server 630 may determine that the first information needs to be updated. Thus, the processor may store the assistant result in the context DB 634. The observation server 630 may generate a policy indicating what update information (second information) should be tracked and notified to the user, based on the assistant result stored in the context DB 634, and store the policy in the policy DB 635. The processor may track the second information, based on the policy stored in the policy DB 635.

Figure 12:
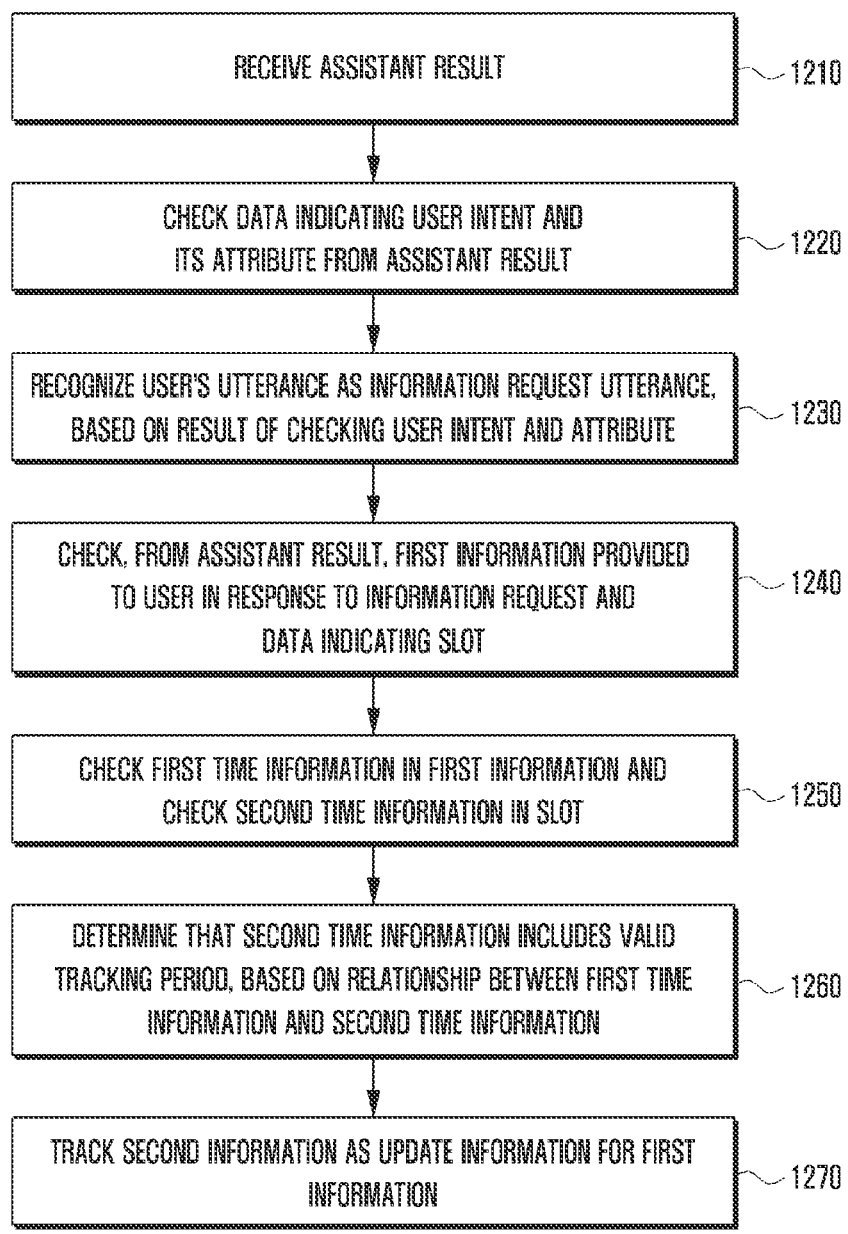
FIG. 12 is a diagram illustrating operations performed by the observation server of FIG. 6, according to an embodiment.

FIG. 12 is a diagram illustrating operations performed by the observation server 630, according to an embodiment. The operations of FIG. 12 may be performed by the processor of the observation server 630 using at least one of the modules 631, 632, and 633 shown in FIG. 6. Operations 1210, 1220, and 1230 are the same as the above-described operations 1110, 1120, and 1130, and thus their descriptions will be omitted.

At operation 1240, as the user's utterance is recognized as the informational utterance, the processor may check, from the assistant result, the first information provided to the user in response to the information request and data indicating the slot.

At operation 1250, the processor may check first time information in the first information and check second time information in the slot.

At operation 1260, the processor may determine that the second time information includes a valid tracking period, based on a relationship between the first time information and the second time information. For example, if the second time information indicates a definite time range (e.g., "2020-10-05~2020-10-11" as in Table 1) and the first time information is a date within the time range, the processor may determine that the second time information includes a valid tracking period. If the period remaining from the current time in the time range is equal to or greater than a specified maximum (e.g., one month) or is a specified minimum (e.g., several hours), the processor may determine that tracking is meaningless. If the attribute of the second time information is different from the attribute of the first time information, the processor may determine that tracking is meaningless. The first time information may be information related to a schedule (e.g., a game schedule), and the second time information may be information indicating an age or a period of a historical event that is not related to a schedule. In this case, the processor may determine that the tracking is meaningless.

At operation 1270, upon the above determination, the processor may track the second information as update information for the first information. The processor may track the second information for a tracking period (e.g., a period remaining from the current time) in the time range included in the second time information, terminate tracking when the tracking period expires, and delete the corresponding policy and assistant result from the DBs 634 and 635.

Figure 13:
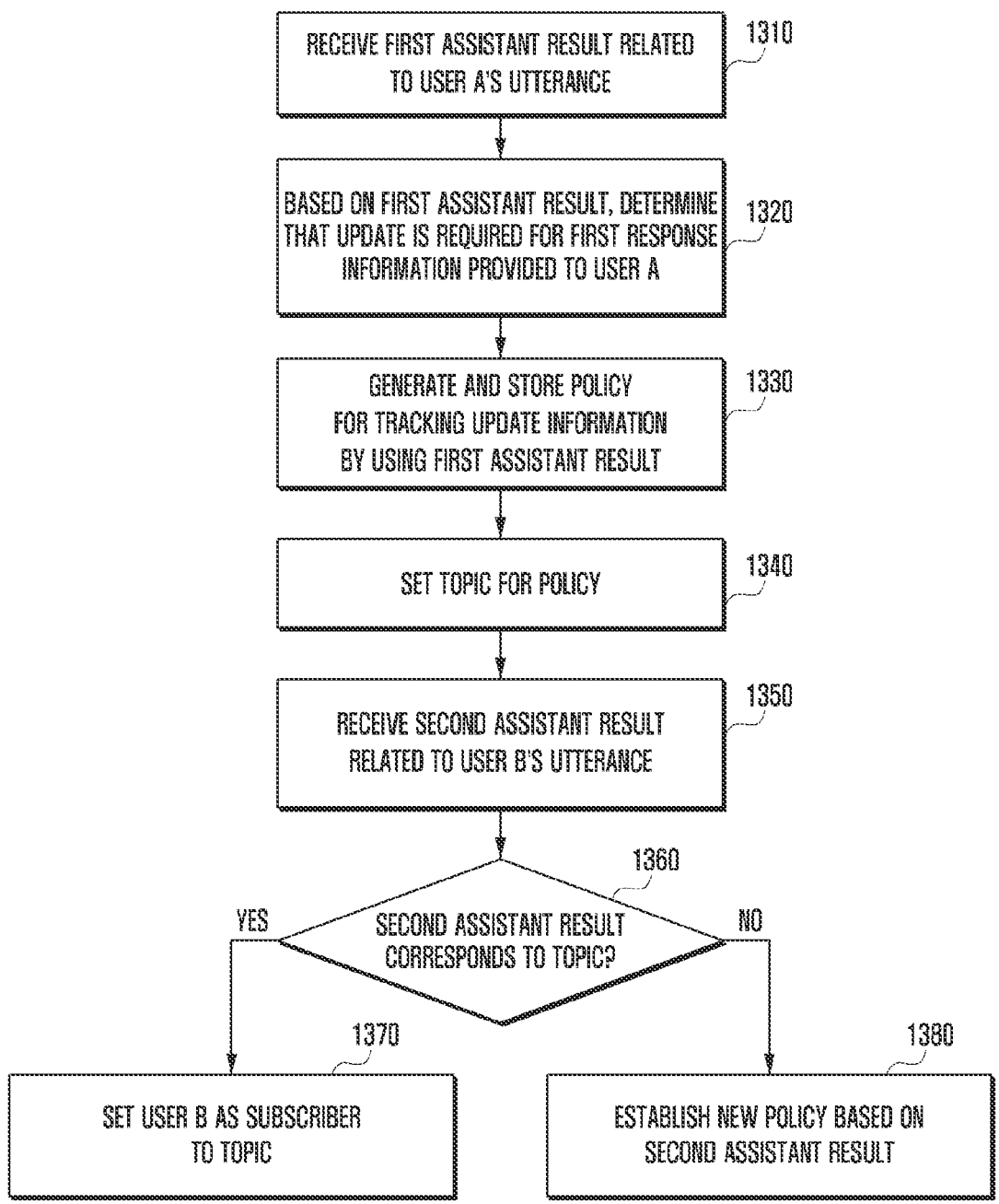
FIG. 13 is a diagram illustrating operations performed by the observation server of FIG. 6, according to an embodiment.

FIG. 13 is a diagram illustrating operations performed by the observation server 630, according to an embodiment. The operations of FIG. 13 may be performed by the processor of the observation server 630 using at least one of the modules 631, 632, and 633 shown in FIG. 6.

At operation 1310, the processor may receive a first assistant result related to a user A's utterance from the AI agent server 620. The first assistant result may include data indicative of the user A's utterance, data indicative of a first intent understood from the user A's utterance, data indicative of an attribute of the utterance, data indicative of a slot associated with the first intent, data indicative of first response information provided to the user A in response to the user A's utterance, and a value (a first parameter) indicative of an attribute of the first response information.

At operation 1320, based on the first assistant result, the processor may determine that an update is required for the first response information provided to the user A.

At operation 1330, using the first assistant result, the processor may generate a policy for tracking update information and store it in the policy DB 635. For example, the processor may generate a policy classified into the items as shown in Table 4 by using the first assistant result.

At operation 1340, the processor may set a topic for the policy stored in the policy DB 635. For example, the processor may classify the first intent and the first parameter (e.g., key information) with the topic in the policy. The processor may set the user A as a subscriber to the set topic.

At operation 1350, the processor may receive a second assistant result related to a user B's utterance from the AI agent server 620. For example, the second assistant result may include data indicative of the user B's utterance, data indicative of a second intent understood from the user B's utterance, data indicative of an attribute of the second intent, data indicative of a slot associated with the second intent, data indicative of second response information provided to the user B in response to the user B's utterance, and a value (a second parameter) indicative of an attribute of the second response information.

At In operation 1360, the processor may determine whether the second assistant result corresponds to the topic. For example, the processor may determine whether the second intent and the second parameter correspond to the topic. In another example, the user A's utterance is "tell me the number of confirmed corona patients", and based on this, the topic "number of confirmed corona patients" may be set. Thereafter, the user B's utterance "the number of confirmed coronavirus cases" is received by the processor, and the processor may determine that the received utterance is an utterance requesting information corresponding to the topic.

If the second assistant result corresponds to the topic (i.e., the yes branch of the operation 1360), the processor may set the user B as a subscriber to the topic at operation 1370. Therefore, the processor may simultaneously provide the updated information obtained by tracking based on the policy to terminals of several subscribers (user A and user B) through the servers 620 and 640. This can be expected to improve the efficiency of the network, which processes duplicated information requests at once instead of individually tracking and responding to them.

If the second assistant result does not correspond to the topic (i.e., the no branch of the operation 1360), the processor may establish a new policy based on the second assistant result at operation 1380.

FIGS. 14, 15, 16, and 17 are diagrams illustrating a dialog between a user and an AI agent provided through a UI screen of the user terminal 610, according to various embodiments.

Figure 14:
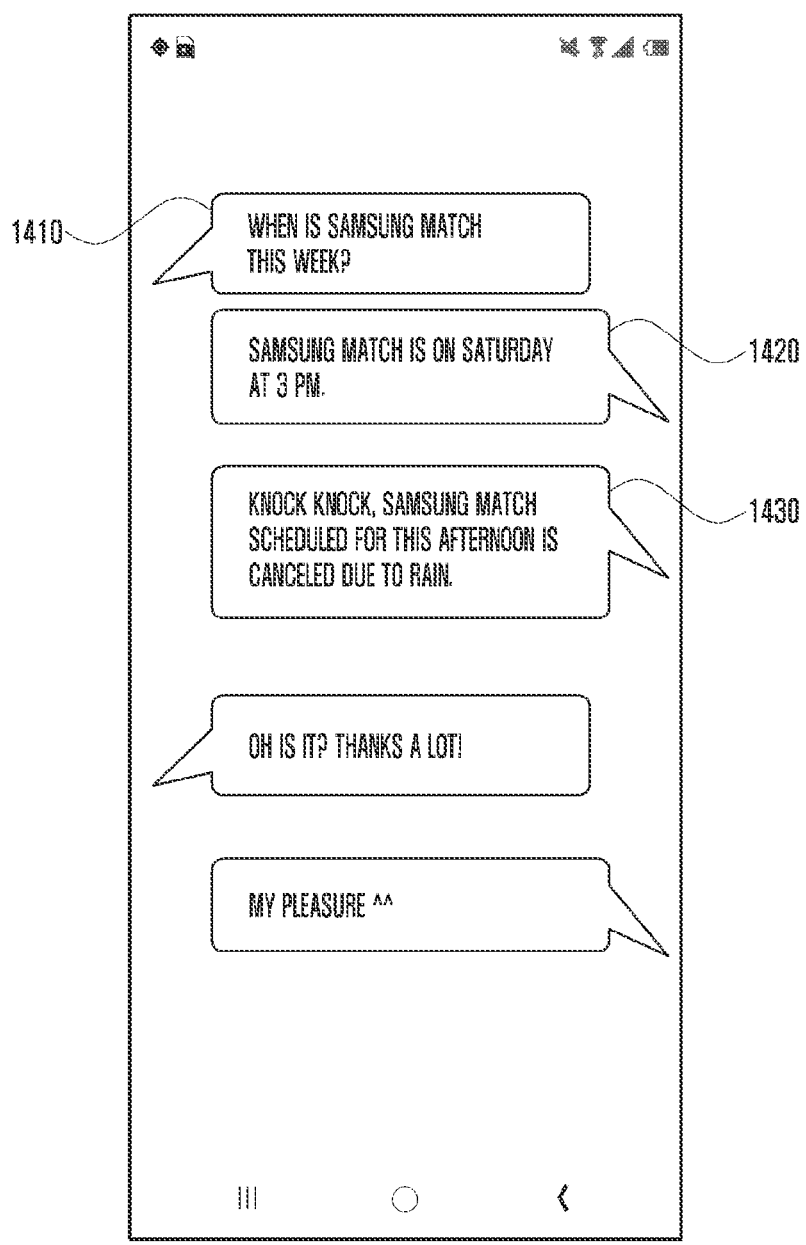
FIG. 14 is a diagram illustrating a dialog between a user and an AI agent provided through a user interface (UI) screen of the user terminal, according to an embodiment.

With reference to FIG. 14, the processor (e.g., the processor 120 in FIG. 1, the processor 316 in FIG. 3, or the processor 619 in FIG. 6) may provide, through the screen, the user 699 with a first utterance 1410 of the user 699 and a first answer 1420 including first schedule information and generated in response to the first utterance by the AI agent server 620. The observation server 630 may detect a change in the first schedule information. For example, the AI agent server 620 may provide information related to a schedule of an event such as a sports game or a concert to the user 699 through the first answer 1420. The observation server 630 may detect a change of the schedule (e.g., cancellation, postponement, or termination). The observation server 630 may deliver updated second schedule information to the AI agent server 620 through the notification server 640. The AI agent server 620 may generate a second answer 1430 by using the second schedule information and provide it to the user terminal 610. The processor 619 may provide the second answer 1430 including the second schedule information to the user 699 through the UI screen.

Figure 15:
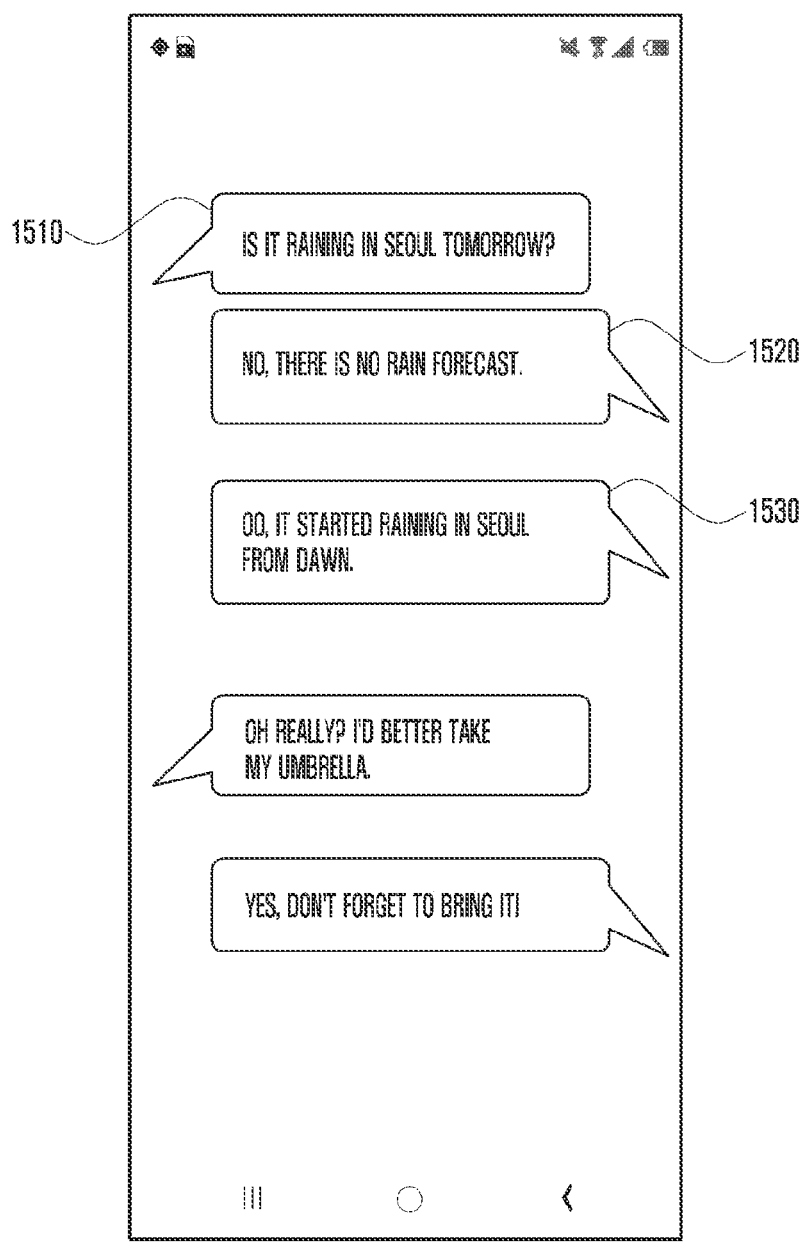
FIG. 15 is a diagram illustrating a dialog between a user and an AI agent provided through a UI screen of the user terminal, according to an embodiment.

With reference to FIG. 15, the processor (e.g., the processor 120 in FIG. 1, the processor 316 in FIG. 3, or the processor 619 in FIG. 6) may provide, through the screen, the user 699 with a first utterance 1510 of the user 699 and a first answer 1520 including first predictive information and generated in response to the first utterance by the AI agent server 620. The observation server 630 may detect a change in the first predictive information. For example, the AI agent server 620 may provide information related to predictions about the future, such as weather or traffic, rather than historical facts or propositions, to the user through the first answer 1420. The observation server 630 may detect a change in the first predictive information (e.g., a change in rain forecast). The observation server 630 may deliver updated second predictive information to the AI agent server 620 through the notification server 640. The AI agent server 620 may generate a second answer 1530 by using the second predictive information and provide it to the user terminal 610. The processor 619 may provide the second answer 1530 including the second predictive information to the user 699 through the UI screen.

Figure 16:
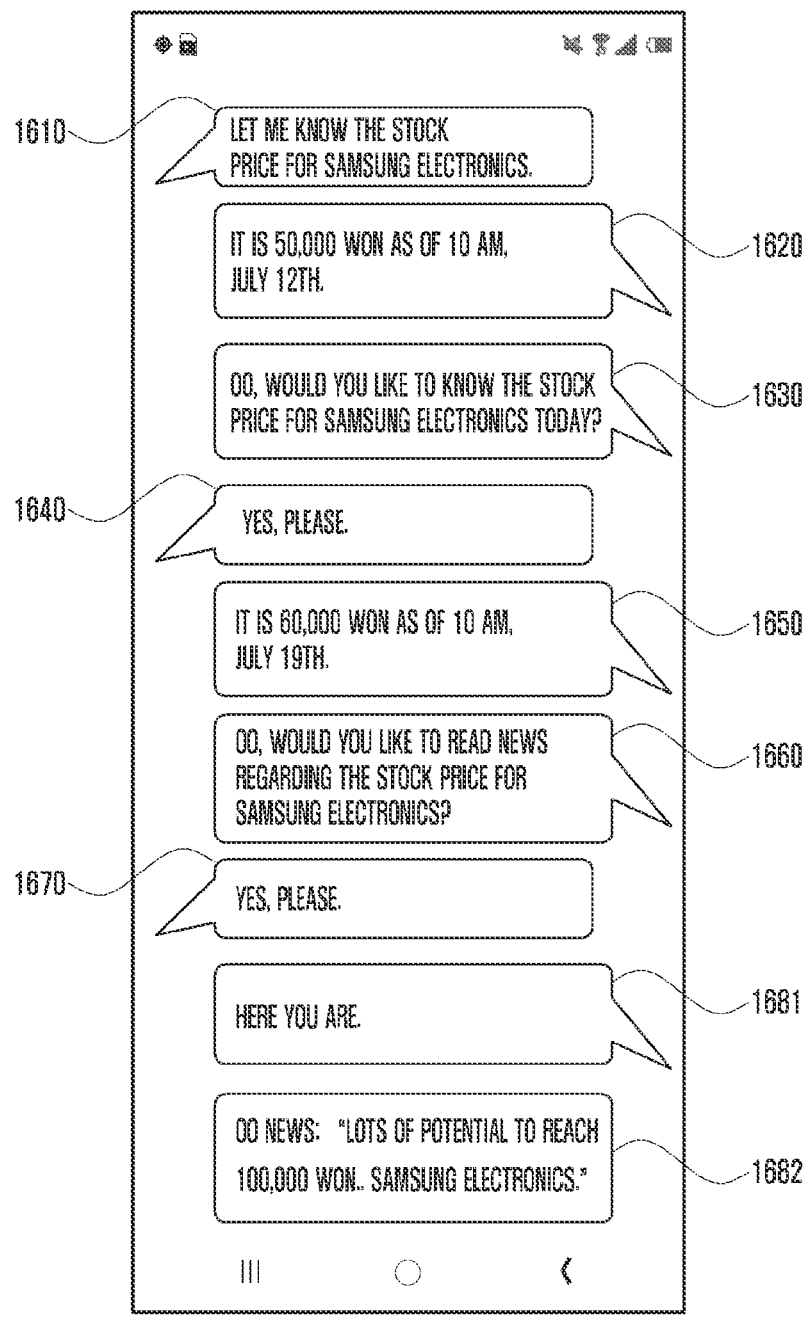
FIG. 16 is a diagram illustrating a dialog between a user and an AI agent provided through a UI screen of the user terminal, according to an embodiment.

With reference to FIG. 16, the processor (e.g., the processor 120 in FIG. 1, the processor 316 in FIG. 3, or the processor 619 in FIG. 6) may provide, through the screen, the user 699 with a first utterance 1610 of the user 699 and a first answer 1620 including first price information generated in response to the first utterance by the AI agent server 620.

The observation server 630 may detect a change in the first price information. For example, the AI agent server 620 may provide information related to a frequently changing price, such as an exchange rate, stock price, or gold price, to the user through the first answer 1620. The observation server 630 may detect a change in the first price information (e.g., a change in the stock price of Samsung Electronics). The observation server 630 may deliver updated second price information to the AI agent server 620 through the notification server 640. The notification server 640 may determine the second price information as valid information preferred by the user, based on log information (e.g., main keywords and/or preference information), and therefore deliver the second price information to the AI agent server 620. In addition, the notification server 640 may determine the second price information as valid information periodically checked by the user, based on another log information (e.g., dialog contents between the user and the AI agent and/or Internet search history), and therefore deliver the second price information to the AI agent server 620.

In response to the reception of the second price information, the AI agent server 620 may generate a first inquiry 1630 for inquiring the user whether to receive new price information and provide it to the user terminal 610. The AI agent server 620 may receive a second utterance 1640 from the user terminal 610 in response to the first inquiry 1630. The AI agent server 620 may understand the second utterance 1640 as an agreement of provision, generate a second answer 1650 by using the second price information, and provide it to the user terminal 610. The processor 619 may provide the second answer 1650 including the second price information to the user 699 through the UI screen.

The processor 619 may provide, in addition to key information (e.g., price information), sub information related thereto to the user through the AI agent's answer. For example, the observation server 630 may identify, in a policy, an identifier indicating what sub information is to be collected in addition to the key information. The observation server 630 may search the Internet for the sub information (e.g., news articles related to Samsung Electronics stock prices) corresponding to the identified identifier and then deliver, to the AI agent server 620 through the notification server 640, link information for accessing the information. The AI agent server 620 may generate a second inquiry 1660 for inquiring the user whether to receive the sub information, and provide it to the user terminal 610. The AI agent server 620 may receive a third utterance 1670 from the user terminal 610 in response to the second inquiry 1660. The AI agent server 620 may understand the third utterance 1670 as an agreement of provision, generate a third answer 1681, and provide it to the user terminal 610 together with the retrieved sub information and/or the link information for access. The processor 619 may provide the third answer 1681 together with contents 1682 (e.g., a part of the sub information) related to the retrieved sub information to the user 699 through the UI screen.

Figure 17:
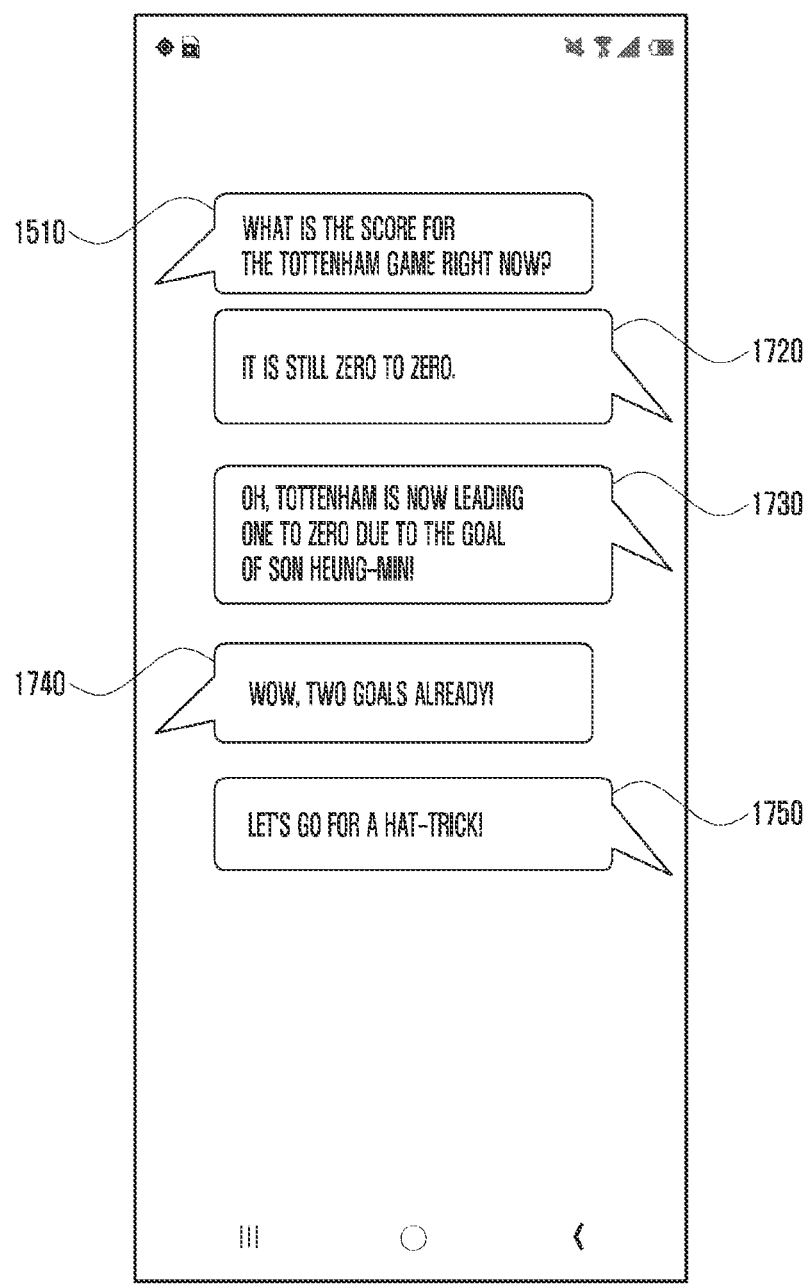
FIG. 17 is a diagram illustrating a dialog between a user and an AI agent provided through a UI screen of the user terminal, according to an embodiment.

With reference to FIG. 17, the processor (e.g., the processor 120 in FIG. 1, the processor 316 in FIG. 3, or the processor 619 in FIG. 6) may provide, through the screen, the user 699 with a first utterance 1710 of the user 699 and a first answer 1720 including first live broadcast information and generated in response to the first utterance by the AI agent server 620. The observation server 630 may detect a change in the first live broadcast information. For example, the AI agent server 620 may provide, to the user 699 through the first answer 1720, information related to a current situation (e.g., a score and/or match player) of an event (e.g., a sports game) being broadcast live.

The observation server 630 may detect a change (e.g., a first goal during a game of a specific soccer player) in the situation of a broadcast live event. The observation server 630 may deliver second live broadcast information according to the situation change to the notification server 640. Based on log information collected from the user terminal 610 and/or the AI agent server 620, the notification server 640 may determine the second live broadcast information as valid information that the user has not yet acquired. The notification server 640 may deliver the valid second live broadcast information to the AI agent server 620. The AI agent server 620 may generate a second answer 1730 by using the second live broadcast information and provide it to the user terminal 610. The processor 619 may provide the second answer 1730 including the second live broadcast information to the user 699 through the UI screen.

The observation server 630 may detect an additional situation change (e.g., a second goal during a game of a specific soccer player) after providing the second live broadcast information. The observation server 630 may deliver third live broadcast information according to the additional situation change to the notification server 640.

The notification server 640 may determine the third live broadcast information as invalid information, based on log information collected from the user terminal 610 and/or the AI agent server 620. For example, through a second utterance 1740 and a third answer 1750 in dialog contents between the user and the AI agent, the notification server 640 may determine the third live broadcast information as information that the user has already acquired and thus does not need to be delivered to the user 699. The notification server 640 may not deliver the third live broadcast information invalid to the user to the AI agent server 620.

The observation server 630 may continue monitoring for the situation change until the live broadcast of the event ends. The notification server 640 may continue to determine whether the event is valid until the live broadcast of the event ends.

In various embodiments, an electronic device (e.g., the observation server 630 in FIG. 6) includes a processor and a memory operatively connected to the processor. The memory may store instructions that, when executed, cause the processor to acquire a first assistant result including data indicative of a first intent understood from an utterance of a first user, data indicative of an attribute of the utterance, first information provided to a terminal of the first user as a response of an AI agent to the utterance, and a first parameter indicative of an attribute of the first information, to recognize the utterance as an information request utterance, based on the first intent and the attribute, and to track second information to be provided to the first user terminal as update information for the first information, based on the utterance being recognized as the information request utterance and the first parameter being identified as a specified type (e.g., the type in Table 3).

The instructions may further cause the processor to track the second information based on the first information being configured in a predefined format (e.g., the format in Table 3).

The instructions may further cause the processor to generate a policy including an identifier indicative of the second information to be tracked, a tracking period, a tracking frequency, and a tracking termination condition by using the first assistant result, and to track the second information, based on the policy.

The first assistant result may further include data indicative of a slot associated with the utterance, and the instructions may cause the processor to check first time information in the first information, to check second time information in the slot, and to track the second information, based on a relationship between the first time information and the second time information. The instructions may cause the processor to, when the second time information includes a time range and the first time information is a date within the time range, determine that the second time information includes a valid tracking period, and to track the second information during the tracking period. The instructions may further cause the processor to, when an attribute of the second time information is different from an attribute of the first time information or the time range is greater than or equal to a specified maximum, disregard tracking the second information.

The instructions may further cause the processor to set a topic by using the first intent and the first parameter, to acquire a second assistant result associated with an utterance of a second user, and to, when a second intent and a second parameter in the second assistant result match the topic, set the second user as a subscriber to receive the second information.

The instructions may further cause the processor to acquire information related to the first user and/or information related to a usage record for an application installed in the first user terminal, to, based on the acquired information, determine whether the second information is valid information that needs to be notified to the first user, and to, when the second information is determined as the valid information, support providing the second information to the first user terminal. The acquired information may include Internet usage records and/or dialog contents between the first user and the AI agent, and the instructions may cause the processor to, when the acquired information has information corresponding to the second information, determine the second information as invalid information that does not need to be notified to the first user, and to, when the acquired information has no information corresponding to the second information, determine the second information as the valid information. The acquired information may include a word that appears more than a specified number of times during a specified period in a dialog between the first user and the AI agent and/or preference information of the first user, and the instructions may cause the processor to, when the acquired information has no information related to the parameter, determine the second information as invalid information that does not need to be notified to the first user, and to, when the acquired information has information related to the parameter, determine the second information as the valid information.

A method for operating an electronic device may include acquiring (e.g., the operation 1110) a first assistant result including data indicative of a first intent understood from an utterance of a first user, data indicative of an attribute of the utterance, first information provided to a terminal of the first user as a response of an AI agent to the utterance, and a first parameter indicative of an attribute of the first information; recognizing (e.g., the operation 1130) the utterance as an information request utterance, based on the first intent and the attribute; and tracking (e.g., the operation 1150) second information to be provided to the first user terminal as update information for the first information, based on the utterance being recognized as the information request utterance and the first parameter being identified as a specified type.

The tracking may further include tracking the second information based on the first information being configured in a predefined format.

The tracking may further include generating a policy including an identifier indicative of the second information to be tracked, a tracking period, a tracking frequency, and a tracking termination condition by using the first assistant result; and tracking the second information, based on the policy.

The first assistant result may further include data indicative of a slot associated with the utterance, and the tracking may further include checking (e.g., the operation 1250) first time information in the first information and checking second time information in the slot; and tracking (e.g., the operation 1270) the second information, based on a relationship between the first time information and the second time information. The tracking may further include, when the second time information includes a time range and the first time information is a date within the time range, determining (e.g., the operation 1260) that the second time information includes a valid tracking period; and tracking the second information during the tracking period. The determining may include, when an attribute of the second time information is different from an attribute of the first time information or the time range is greater than or equal to a specified maximum, determining that tracking of the second information is meaningless.

The method may further include setting (e.g., the operation 1340) a topic by using the first intent and the first parameter; acquiring (e.g., the operation 1350) a second assistant result associated with an utterance of a second user; and when a second intent and a second parameter in the second assistant result match the topic, setting (e.g., the operation 1370) the second user as a subscriber to receive the second information.

The method may further include acquiring information related to the first user and/or information related to a usage record for an application installed in the first user terminal; based on the acquired information, determining whether the second information is valid information that needs to be notified to the first user; and when the second information is determined as the valid information, supporting providing the second information to the first user terminal. The acquired information may include Internet usage records and/or dialog contents between the first user and the AI agent, and the determining may include, when the acquired information has information corresponding to the second information, determining the second information as invalid information that does not need to be notified to the first user; and when the acquired information has no information corresponding to the second information, determining the second information as the valid information. The acquired information may include a word that appears more than a specified number of times during a specified period in a dialog between the first user and the AI agent and/or preference information of the first user, and the determining may include, when the acquired information has no information related to the parameter, determining the second information as invalid information that does not need to be notified to the first user; and when the acquired information has information related to the parameter, determining the second information as the valid information.

Embodiments of the disclosure and the accompanying drawings are only examples presented in order to easily describe the disclosure and facilitate comprehension of the disclosure, but are not intended to limit the scope of the disclosure. Therefore, the scope of the disclosure should be construed as including all changes or modifications derived from the technical contents of the disclosure in addition to the embodiments disclosed herein.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device comprising:
a processor; and
memory storing instructions that, when executed by the processor, causes the electronic device to:
    acquire a first assistant result including data indicative of a first intent understood from an utterance of a first user, data indicative of an attribute of the utterance, first information provided to a terminal of the first user as a response of an artificial intelligence (AI) agent to the utterance, and a first parameter indicative of an attribute of the first information,
    recognize the utterance as an information request utterance, based on the first intent and the attribute of the utterance,
    in response to the utterance being recognized as the information request utterance and the first parameter being identified as a specified type, generate a policy including an identifier indicative of second information to be provided to the first user terminal as update information for the first information, a tracking period, a tracking frequency, and a tracking termination condition by using the first assistant result, and
    track the second information based on the policy,
wherein the instructions further cause the electronic device to:
    set a topic by using the first intent and the first parameter,
    acquire a second assistant result associated with an utterance of a second user, and
    when a second intent and a second parameter in the second assistant result match the topic, set the second user as a subscriber to receive the second information,
wherein the first assistant result further includes data indicative of a slot associated with the utterance, and
wherein the instructions further cause the electronic device to:
    check first time information in the first information and second time information in the slot, based on the second time information including a time range and the first time information being a date within the time range, determine that the second time information includes a valid tracking period, track the second information, during the tracking period, based on a relationship between the first time information and the second time information, and based on an attribute of the second time information being different from an attribute of the first time information or the time range being greater than or equal to a specified maximum, disregard tracking the second information.

2. The electronic device of claim 1, wherein the instructions further cause the electronic device to:

track the second information based on the first information being configured in a predefined format.

3. The electronic device of claim 1, wherein the tracking termination condition includes at least one of an end of event condition, a visited location condition, or an explicit cancel condition.

4. The electronic device of claim 1, wherein the instructions further cause the electronic device to:

acquire information related to the first user or information related to a usage record for an application installed in the first user terminal, based on the acquired information, determine whether the second information is valid information that needs to be notified to the first user, and when the second information is determined as the valid information, support providing the second information to the first user terminal.

5. The electronic device of claim 4, wherein the acquired information includes Internet usage records or dialog contents between the first user and the AI agent, and wherein the instructions further cause the electronic device to:

when the acquired information has information corresponding to the second information, determine the second information as invalid information that does not need to be notified to the first user, and when the acquired information has no information corresponding to the second information, determine the second information as the valid information.

6. The electronic device of claim 4, wherein the acquired information includes a word that appears more than a specified number of times during a specified period in a dialog between the first user and the AI agent or preference information of the first user, and wherein the instructions further cause the electronic device to:

when the acquired information has no information related to the parameter, determine the second information as invalid information that does not need to be notified to the first user, and when the acquired information has information related to the parameter, determine the second information as the valid information.

7. A method for operating an electronic device, the method comprising:

acquiring a first assistant result including data indicative of a first intent understood from an utterance of a first user, data indicative of an attribute of the utterance, first information provided to a terminal of the first user as a response of an artificial intelligence (AI) agent to the utterance, and a first parameter indicative of an attribute of the first information;

recognizing the utterance as an information request utterance, based on the first intent and the attribute of the utterance;

in response to the utterance being recognized as the information request utterance and the first parameter being identified as a specified type, generating a policy including an identifier indicative of second information to be provided to the first user terminal as update information for the first information, a tracking period, a tracking frequency, and a tracking termination condition by using the first assistant result; and tracking the second information based on the policy, the method further comprising:

setting a topic by using the first intent and the first parameter;

acquiring a second assistant result associated with an utterance of a second user; and when a second intent and a second parameter in the second assistant result match the topic, setting the second user as a subscriber to receive the second information, wherein the first assistant result further includes data indicative of a slot associated with the utterance, wherein tracking the second information comprises:

checking first time information in the first information and second time information in the slot;

based on the second time information including a time range and the first time information being a date within the time range, determining that the second time information includes a valid tracking period; and tracking the second information, during the tracking period, based on a relationship between the first time information and the second time information, and wherein the method further comprises, based on an attribute of the second time information being different from an attribute of the first time information or the time range being greater than or equal to a specified maximum, disregarding tracking the second information.

8. The method of claim 7, wherein tracking the second information further includes:

tracking the second information based on the first information being configured in a predefined format.

9. The method of claim 7, wherein the tracking termination condition includes at least one of an end of event condition, a visited location condition, or an explicit cancel condition.

10. The method of claim 7, further comprising:

acquiring information related to the first user or information related to a usage record for an application installed in the first user terminal;

based on the acquired information, determining whether the second information is valid information that needs to be notified to the first user; and when the second information is determined as the valid information, supporting providing the second information to the first user terminal.

11. The method of claim 10, wherein the acquired information includes Internet usage records or dialog contents between the first user and the AI agent, and wherein determining whether the second information is valid information that needs to be notified to the first user further includes:

when the acquired information has information corresponding to the second information, determining the second information as invalid information that does not need to be notified to the first user; and when the acquired information has no information corresponding to the second information, determining the second information as the valid information.

12. The method of claim 10, wherein the acquired information includes a word that appears more than a specified number of times during a specified period in a dialog between the first user and the AI agent or preference information of the first user, and
   wherein determining whether the second information is valid information that needs to be notified to the first user further includes:
   when the acquired information has no information related to the parameter, determining the second information as invalid information that does not need to be notified to the first user; and
   when the acquired information has information related to the parameter, determining the second information as the valid information.

\* \* \* \* \*